(12) United States Patent
Kim et al.

(10) Patent No.: US 11,833,796 B2
(45) Date of Patent: Dec. 5, 2023

(54) FILM ATTACHING APPARATUS FOR ELECTRONIC DEVICE INCLUDING DISPLAY

(71) Applicants: Samsung Electronics Co., Ltd., Suwon-si (KR); HOYEON CO., LTD, Gumi-si (KR)

(72) Inventors: Minchur Kim, Suwon-si (KR); Jaekwang Lee, Gumi-si (KR)

(73) Assignees: Samsung Electronics Co., Ltd., Suwon-si (KR); HOYEON Co., Ltd, Gumi-si (KR)

( * ) Notice: Subject to any disclaimer, the term of this patent is extended or adjusted under 35 U.S.C. 154(b) by 22 days.

(21) Appl. No.: 17/846,598

(22) Filed: Jun. 22, 2022

(65) Prior Publication Data

US 2022/0402259 A1    Dec. 22, 2022

Related U.S. Application Data

(63) Continuation of application No. PCT/KR2022/008869, filed on Jun. 22, 2022.

(30) Foreign Application Priority Data

Jun. 22, 2021  (KR) .................... 10-2021-0081025

(51) Int. Cl.
 *B32B 37/10*  (2006.01)
 *B32B 37/00*  (2006.01)
  (Continued)

(52) U.S. Cl.
 CPC .......... *B32B 37/10* (2013.01); *B32B 37/0053* (2013.01); *B32B 38/1808* (2013.01);
  (Continued)

(58) Field of Classification Search
 CPC . B32B 37/0053; B32B 37/003; B29C 66/342; B29C 63/0047; B29C 66/345; B29C 63/02; B29C 2063/0008
 See application file for complete search history.

(56) References Cited

U.S. PATENT DOCUMENTS

2015/0101757 A1    4/2015 Onishi et al.

FOREIGN PATENT DOCUMENTS

CN    108860743 A    11/2018
CN    109968651 A  *  7/2019
(Continued)

OTHER PUBLICATIONS

International Search Report dated Sep. 23, 2022, issued in International Patent Application No. PCT/KR2022/008869.

*Primary Examiner* — Carson Gross
(74) *Attorney, Agent, or Firm* — Jefferson IP Law, LLP

(57) ABSTRACT

The disclosure relates to a device (e.g., a jig) for attaching a protective film for protecting a display included in a foldable electronic device from impact and scratching. A film attaching apparatus for attaching a film to an electronic device is provided. The film attaching apparatus includes a display, wherein the film attaching apparatus may include a main body including a base plate, a jig disposed on a base plate and configured to seat the electronic device thereon, a film suction-fixing part inclined at a predetermined angle with respect to the jig, and a roller module disposed on the base plate and including a roller slidable above the jig, wherein the film suction-fixing part may include two or more divided suction areas which are sequentially arranged to correspond to a moving direction of the roller module and configured to have different suction forces.

20 Claims, 24 Drawing Sheets

(51) Int. Cl.
  *B32B 38/18*    (2006.01)
  *B29C 63/00*    (2006.01)
  *B29C 63/02*    (2006.01)
  *B29C 65/00*    (2006.01)

(52) U.S. Cl.
  CPC .......... *B29C 63/0047* (2013.01); *B29C 63/02* (2013.01); *B29C 66/342* (2013.01); *B29C 66/345* (2013.01); *B29C 2063/0008* (2013.01); *B32B 37/003* (2013.01); *B32B 2307/51* (2013.01); *B32B 2367/00* (2013.01); *B32B 2375/00* (2013.01); *B32B 2457/20* (2013.01)

(56)    References Cited

FOREIGN PATENT DOCUMENTS

| | | | | |
|---|---|---|---|---|
| CN | 110712790 A | * | 1/2020 | ............ B29C 63/02 |
| CN | 112519197 A | * | 3/2021 | |
| JP | 2013-244602 A | | 12/2013 | |
| KR | 10-1252750 B1 | | 4/2013 | |
| KR | 10-2016-0050949 A | | 5/2016 | |
| KR | 10-1826046 B1 | | 2/2018 | |
| KR | 10-2019-0105355 A | | 9/2019 | |
| KR | 10-2043140 B1 | | 11/2019 | |
| KR | 10-2020-0004951 A | | 1/2020 | |
| KR | 20200004951 A | * | 1/2020 | |
| KR | 10-2020-0085480 A | | 7/2020 | |

* cited by examiner

FILM ATTACHING APPARATUS FOR ELECTRONIC DEVICE INCLUDING DISPLAY

CROSS-REFERENCE TO RELATED APPLICATION(S)

This application is a continuation application, claiming priority under § 365(c), of an International application No. PCT/KR2022/008869, filed on Jun. 22, 2022, which is based on and claims the benefit of a Korean patent application number 10-2021-0081025, filed on Jun. 22, 2021, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD., and 2) HOYEON CO., LTD.

TECHNICAL FIELD

The disclosure relates to an apparatus (e.g., a jig) for attaching a protective film for protecting a display included in a foldable display from impact and scratching.

BACKGROUND ART

A protective film may be attached to a flat or three-dimensional (3D)-shaped mobile electronic device to protect a front display thereof. For example, as a conventionally used protective film, an ultraviolet (UV)-curable film having a high hardness may be used to protect the display from external physical impact and scratching.

In order to attach the protective film in the process of manufacturing the flat or 3D-shaped mobile electronic device, a method of using a separate jig matching the shape of a model, a roller, and the like may be used. For example, in a conventional method of attaching a protective film to a front display area of a mobile electronic device, the electronic device is seated on a simple jig, and a user manually attaches the protective film to the display by causing the one surface of the protective film to come into close contact with the display using a pusher or the like or attaches the protective film using attaching equipment having a simple shape.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In the recently disclosed foldable electronic devices, due to the nature of being folded in half, when an existing type of film (e.g., a UV-curable film) is applied, the film may be lifted when folded, or the quality of products may be deteriorated due to the generation of air bubbles when attaching the film. Therefore, as a protective film attached to a foldable electronic device, a film that is stretchable and has a low hardness like rubber, for example, a film made of a polyurethane material, may be applied.

However, when attaching a film made of a urethane material to a foldable electronic device, according to a conventionally known method of attaching a protective film, for example, a method of attaching a film using a roller in a state in which the upper and lower ends of the film are caught and fixed to a jig, sagging may occur in the film at the time of attaching the film and thus lines in the form of a comb pattern may be visually recognized. In addition, according to the conventionally known method of attaching a protective film, the fixed portions on the opposite sides of the film may interfere with a structure of a film attaching jig, which may cause a problem in that since the attachment is not smoothly performed, a wrinkle or a stain occurs.

Aspects of the disclosure are to address at least the above-mentioned problems and/or disadvantages and to provide at least the advantages described below. Accordingly, an aspect of the disclosure is to provide a film attaching apparatus that, in the case of attaching a protective film (e.g., a protective film made of urethane) to a foldable electronic device, prevents sagging of the film and further to prevent the film from interfering with a structure of an attaching jig.

Additional aspects will be set forth in part in the description which follows and, in part, will be apparent from the description, or may be learned by practice of the presented embodiments.

Technical Solution

In accordance with an aspect of the disclosure, a film attaching apparatus for attaching a film to an electronic device including a display is provided. The film attaching apparatus includes a main body including a base plate, a jig disposed on the base plate, the jig configured to seat an electronic device thereon, a film suction-fixing part inclined at a predetermined angle with respect to the jig, and a roller module disposed on the base plate and configured to be slidable above the jig. The film suction-fixing part may include two or more divided suction areas which are sequentially arranged to correspond to a moving direction of the roller module and are configured to have different suction forces, respectively.

In accordance with another aspect of the disclosure, a film attaching apparatus for attaching a film to a foldable electronic device including a flexible display is provided. The film attaching apparatus includes a main body including a base plate, a jig disposed on the base plate, the jig configured to seat thereon the electronic device disposed on the base plate, at least one inclined support part disposed on the base plate, a cover part connected to the inclined support part by a hinge structure and configured to cover the jig by an opening and closing operation, a film suction-fixing part disposed on one surface of the cover part and configured to be capable of suctioning and removing the film in a state of being inclined at a predetermined angle with respect to the jig, and a roller module disposed on the base plate and including a roller slidable above the jig. The film suction-fixing part may include a first suction area, a second suction area, and a third suction area sequentially disposed to correspond to the moving direction of the roller module.

Advantageous Effects

According to various embodiments of the disclosure, it is possible to provide an apparatus capable of automatically attaching a film made of a urethane material to a display of a foldable electronic device.

According to various embodiments of the disclosure, it is possible to provide a film attaching apparatus applicable to foldable electronic devices having various specifications.

According to various embodiments of the disclosure, by providing two or more suction areas having different suction forces, it is possible to maintain a fixing force for a film until the end of a process of attaching the film by causing the suction of the film to be sequentially released in the process of attaching the film. As a result, it is possible to prevent the film from being dropped at the time of attaching the film while minimizing the generation of air bubbles during the attaching operation. At the time of attaching operation, it is possible to prevent occurrence of a defect in the form of a comb pattern or a defect in the form of a wrinkle on the film due to deformation caused by an external force.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

Figure 1:
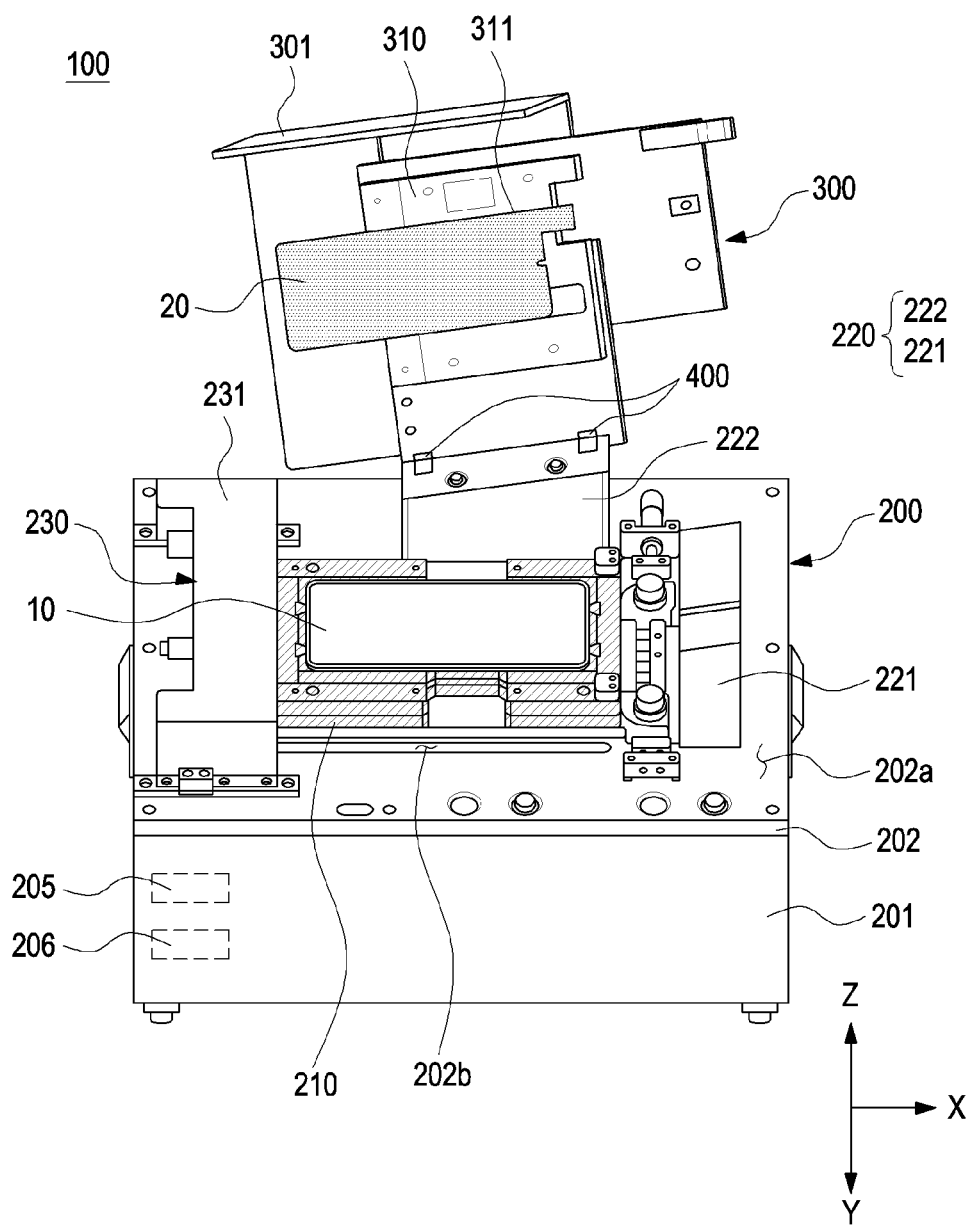
FIG. 1 is a perspective view illustrating an electronic device including a display and an apparatus for attaching a film thereto (hereinafter, simply referred to as a "film attaching apparatus") in a first state (open state) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms including ordinal numbers, such as "first" and "second", may be used to describe various elements, but the elements are not limited by the terms. These terms are used only for the purpose of distinguishing one component from another. For example, without departing from the scope of the disclosure, a first component may be referred to as a second component, and similarly, a second component may also be referred to as a first component. The term "and/or" includes a combination of a plurality of related listed items or any of a plurality of related listed items.

In addition, relative terms described with reference to an object shown in the drawings, such as "front", "rear", "top", and "bottom", may be replaced with ordinal numbers such as "first" and "second". In ordinal numbers such as "first" and "second", the order is arbitrarily determined according to the mentioned order and may be arbitrarily changed as necessary.

The terms used herein are used for the purpose of describing particular example embodiments only and are not intended to be limiting. An expression in a singular form includes an expression in a plural form as well, unless the context clearly indicates otherwise. It should be understood that terms, such as "comprise" and "have", used herein are intended to specify the presence of stated features, numbers, steps, operations, elements, components, or combinations thereof, but are not intended to preclude in advance the presence or addition of one or more other features, numbers, steps, operations, steps, elements, components, or combinations thereof.

Unless otherwise defined, all terms used herein, including technical or scientific terms, have the same meaning as commonly understood by a person ordinarily skilled in the art to which the disclosure belongs. Terms, such as those defined in a commonly used dictionary, should be interpreted as having a meaning consistent with the meaning in the context of the related art, and should not be interpreted in an ideal or excessively formal meaning unless explicitly defined herein.

FIG. 1 is a perspective view illustrating an electronic device including a display and an apparatus for attaching a film thereto (hereinafter, simply referred to as a "film attaching apparatus") in a first state (open state) according to an embodiment of the disclosure.

FIG. 1 and the drawings following the same illustrate a direction component X, a direction component Y, and a direction component Z. The direction component X, the direction component Y, and the direction component Z may form a spatial coordinate system in which the direction components are orthogonal to each other. The direction component X may represent the length direction of a film attaching apparatus 100, the direction component Y may represent the width direction of the film attaching apparatus 100, and the direction component Z may represent the height (or thickness) direction of the film attaching apparatus 100.

Referring to FIG. 1, an electronic device 10 may correspond to various types of electronic devices. The electronic device 10 may include at least one of, for example, a portable communication device (a smartphone), a tablet personal computer (PC), a mobile phone, an image phone, an e-book reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera, or a wearable device. According to an embodiment, as an electronic device 10 in which a display is expandable, all foldable electronic devices may be included. In addition, the electronic device 10 according to various embodiments disclosed herein is an electronic device in which a display is expandable and may include a sliding-type rollable electronic device in which at least a portion of a display disposed in a housing is movable to an unfolded state and a rolling-type rollable electronic device in which at least a portion of a display disposed in a housing is capable of being rolled by a roller.

A protective film 20 may be attached to the electronic device 10 including the display using the film attaching apparatus 100. The protective film 20 attached to the electronic device 10 may be a film made of a flexible, elastic and flexible material (e.g., urethane, thermoplastic polyurethane (TPU), or polyethylene terephthalate (PET)), and, as will be described later, the protective film may be in the state in which an adhesive layer is formed on at least one surface thereof to be attached on a display. The film attaching apparatus 100 may perform an operation of attaching the protective film 20 semi-automatically or automatically by a user's button operation or by a predetermined process.

The film attaching apparatus 100 of the disclosure may include a main body 200 and a cover part 300. The main body 200 may include a controller 201 and a base plate 202 provided on one surface of the controller 201. The cover part 300 may include a cover 301 and a film suction-fixing part 310 provided on an inner surface of the cover 301, and may be used in the state in which a protective film 20 is mounted on a seating surface 311 of the film suction-fixing part 310. A jig 210 for seating the electronic device 10 may be disposed on one surface 202a of the base plate 202, and at least one inclined support part 220 for mounting the film suction-fixing part 310 to be inclined at a predetermined angle may be disposed around the jig 210. A plurality of inclined support parts 220 may be provided, and according to the embodiment illustrated in FIG. 1, two inclined support parts 221 and 222 may be disposed around the jig 210. A roller module 230 for pressing the protective film 20 against the display when attaching the protective film 20 to the electronic device 10 seated on the jig 210 may be disposed on one surface 202a of the base plate 202. The roller module 230 may be provided to slide in one direction (e.g., the X-axis direction) along a recess 202b provided in the base plate 202. FIG. 1 illustrates a state in which the internal configuration of the roller module 230 is not visually recognized from the outside by being surrounded by the block cover 231. A detailed configuration of the roller module 230 will be described later in detail with reference to FIG. 3 and the drawings following FIG. 3.

The inclined support part 220 has a top surface inclined at a predetermined angle with respect to the base plate 202, so that, when the cover part 300 is mounted on the inclined support part 220, the cover part 300 can be inclined at a predetermined angle with respect to the jig 210. According to an embodiment, the inclined support part 220 may include a first inclined support part 221 and a second inclined support part 222. Of the first and second inclined support parts, the second inclined support part 222 may be provided with a hinge structure 400 so as to enable an opening/closing operation between the main body 200 and the cover part 300.

According to various embodiments, the controller 201 of the main body 200 may be provided with a plurality of electronic components. For example, as the plurality of electronic components provided in the controller 201, a processor 205 and a memory 206 may be included. The processor 205 may, for example, execute software (e.g., a program) to control at least one other component (e.g., a hardware or software component such as a roller or a pneumatic control valve) of the film attaching apparatus 100 connected to the processor 205, and may execute various data processes or arithmetic operations. According to an embodiment, as at least a part of data processes or arithmetic operations, the processor 205 may store a command or data received from another component (e.g., a communication module) in a volatile memory, may process the command or data stored in the volatile memory, and may store resulting data in a non-volatile memory. The memory 206 is a volatile or non-volatile memory and may store various data used in at least one component (e.g., the processor) of the film attaching apparatus. The data may include, for example, input data or output data for software (e.g., a program) and instructions related thereto.

Figure 2:
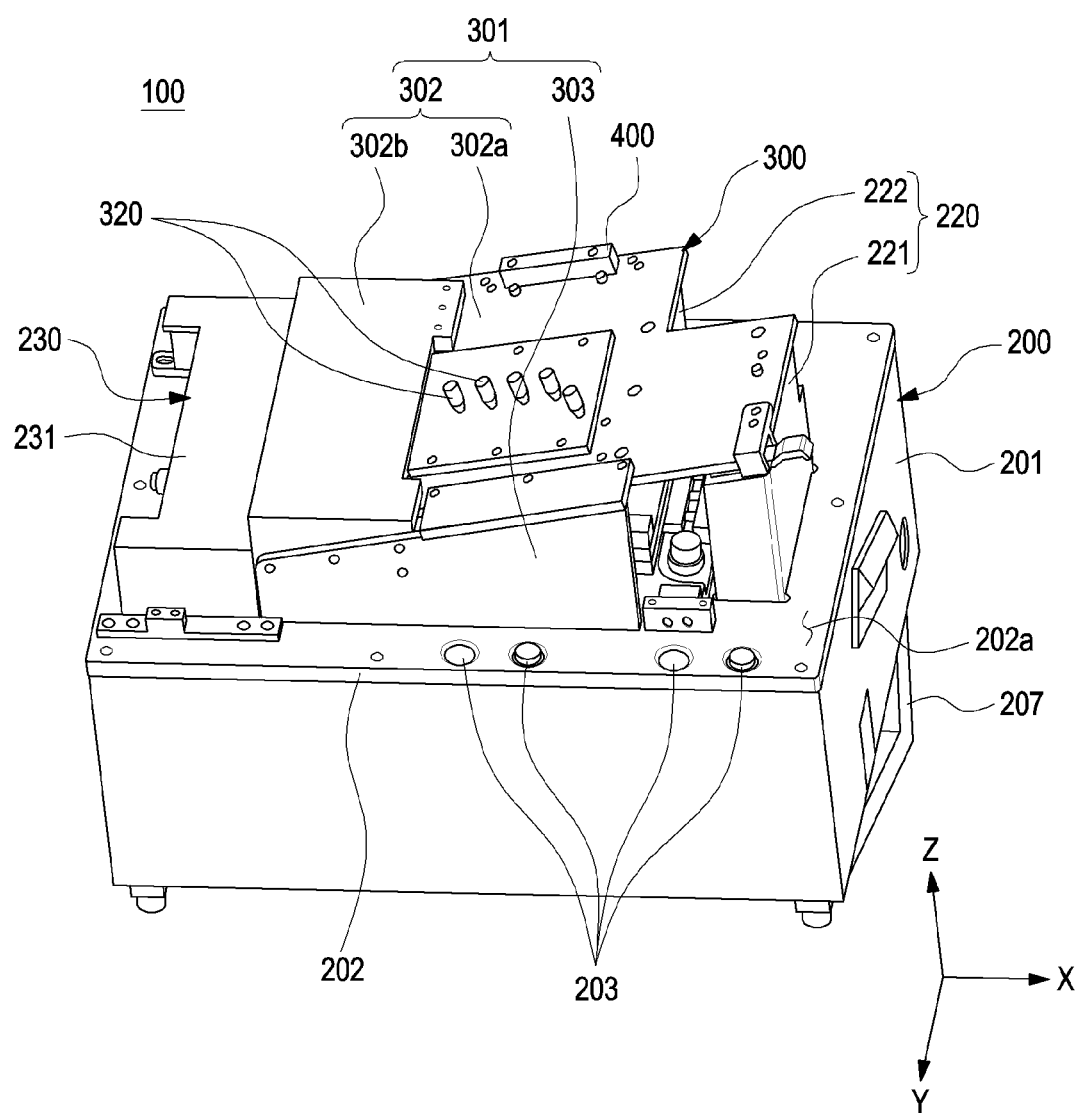
FIG. 2 is a perspective view illustrating the electronic device including the display and the film attaching apparatus in a second state (closed state) according to an embodiment of the disclosure.

FIG. 2 is a perspective view illustrating an electronic device including a display and a film attaching apparatus in a second state (closed state) according to an embodiment of the disclosure.

FIG. 1 may illustrate a "first state of the film attaching apparatus 100" in which the electronic device 10 is exposed to be visually recognized from the outside. FIG. 2 may illustrate a "second state of the film attaching apparatus 100" in which the electronic device 10 is not visually recognized from the outside. Meanwhile, the "first state of the film attaching apparatus 100" illustrated in FIG. 1 may be defined as the state in which the film attaching apparatus is opened, and the "second state of the film attaching apparatus 100" illustrated in FIG. 2 may be defined as the state in which the film attaching apparatus is closed. In the description made with reference to FIG. 2 and the following drawings, a description overlapping the description of the embodiment of FIG. 1 will be omitted.

Referring to FIG. 2, the cover 301 may include a first cover 302 and a second cover 303. The first cover 302 may include a $(1-1)^{th}$ cover 302a and a $(1-2)^{th}$ cover 302b. The first cover 302 and the second cover 303 may serve to cover the outside such that the jig and the electronic device seated on the jig are not visually recognized in the second state (closed state) of the film attaching apparatus 100. Alternatively, the first cover 302 and the second cover 303 may be provided to surround the jig and the electronic device seated on the jig in order to prevent the film attaching operation from being interfered by external physical impact or infiltration of foreign matter or moisture. Referring to FIGS. 1 and 2, the cover part 300 including the first cover 302 and the second cover 303 is illustrated in the state in which the jig and the electronic device seated on the jig are not closed. However, the disclosure is not necessarily limited thereto, and the film attaching operation may be performed in a closed environment by further including another cover not illustrated in the drawings.

Referring to FIG. 2, a plurality of pneumatic control valves 320 (e.g., the pneumatic control valves 320 in FIG. 10) may be connected to one surface of the cover part 300. In the drawing, only the nozzle portions of the pneumatic control valves 320 are illustrated, and components such as hoses connected to the pneumatic control valves 320 are omitted. The film attaching apparatus 100 may suction the protective film 20 in a vacuum state via the plurality of pneumatic control valves 320, and by adjusting the pressure provided to the pneumatic control valves 320, the protective film 20 may be removed from the film suction-fixing part (e.g., the film suction-fixing part 310 in FIG. 1).

According to various embodiments, a user may perform the opening/closing operation of the cover part 300 with respect to the main body 200 and the control of the roller module 230 and the pneumatic control valves 320 using an input device (e.g., buttons 203) provided in the main body 200 of the film attaching apparatus 100. In addition, the user may perform visual inspection for the presence/absence of foreign matter on the surface of the display by controlling an inclination adjusting device 207 using the input device (e.g., buttons 203) provided in the main body 200 to adjust the inclination of the main body 200 before/after attaching the film.

Figure 3:
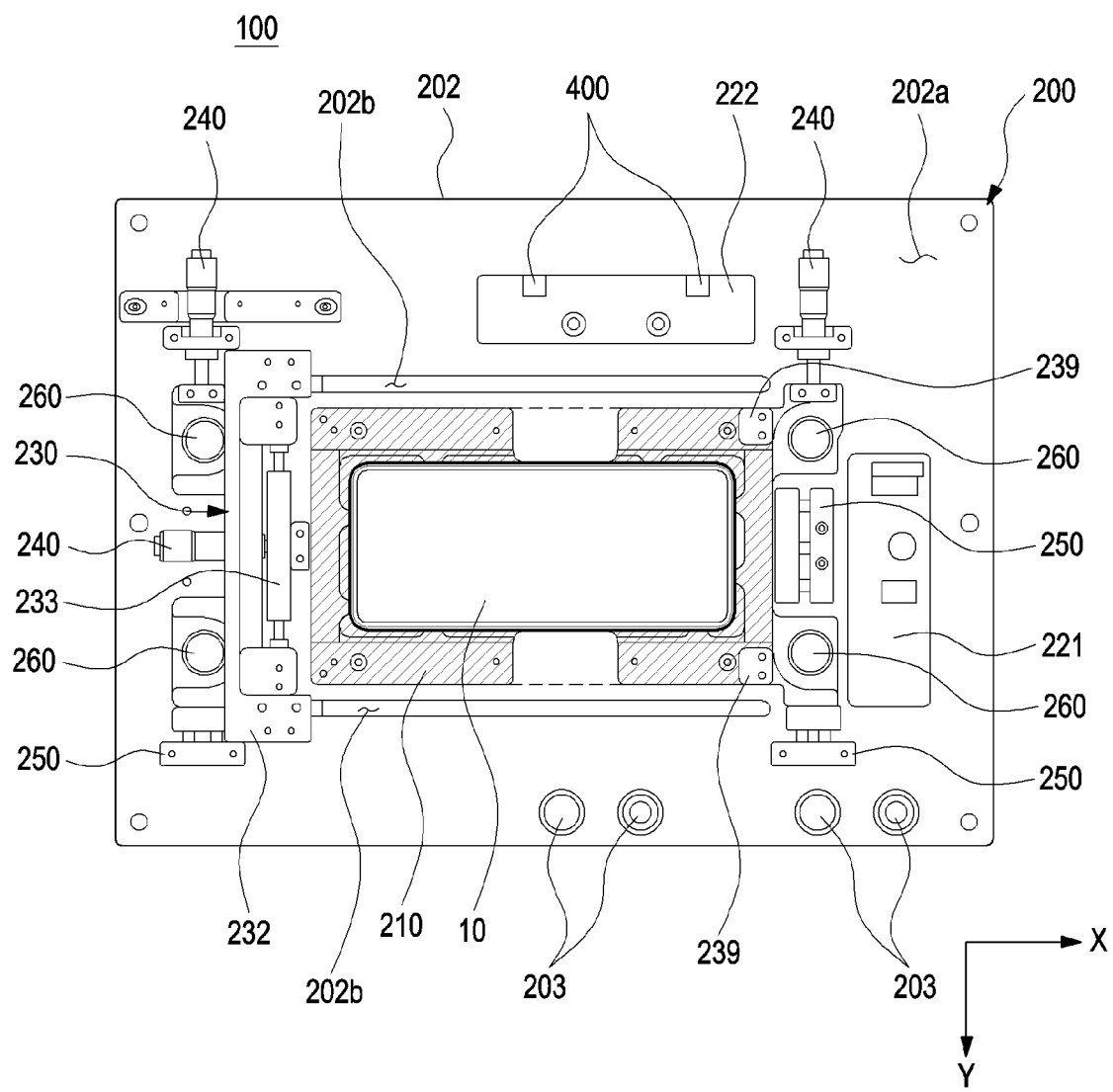
FIG. 3 is a top view illustrating the film attaching apparatus according to an embodiment of the disclosure.
Figure 4:
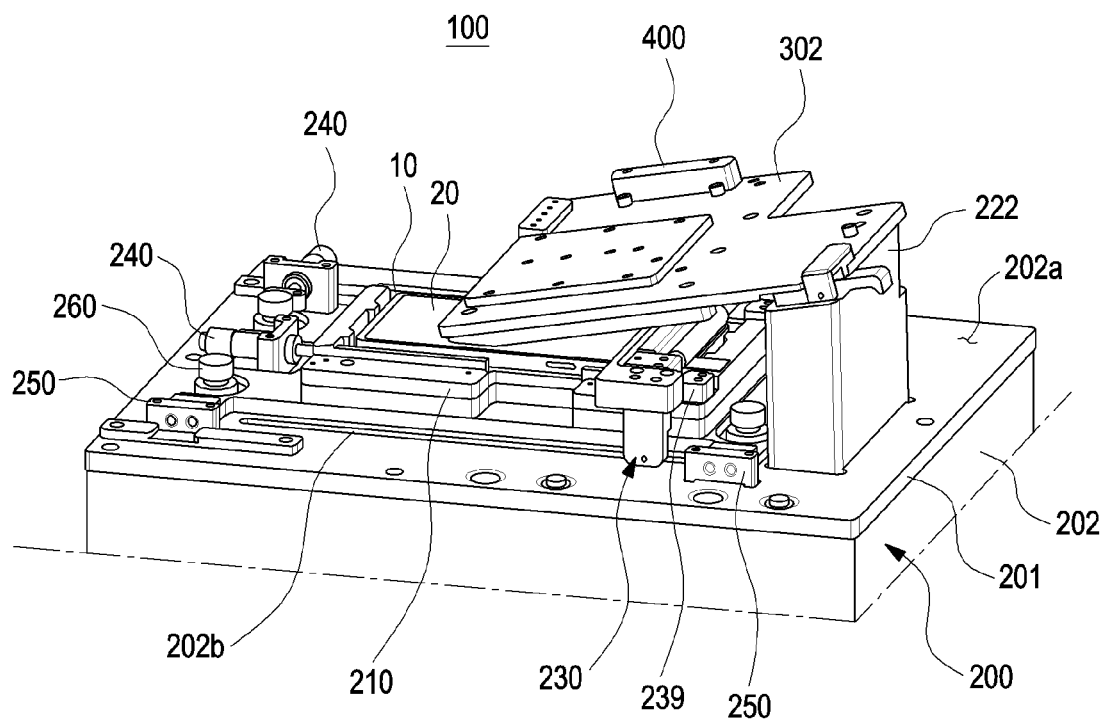
FIG. 4 is a view illustrating an arrangement state of components included in the film attaching apparatus in the second state (closed state) of the film attaching apparatus according to an embodiment of the disclosure.

FIG. 3 is a top view illustrating the film attaching apparatus 100 according to an embodiment of the disclosure. FIG. 4 is a view illustrating an arrangement state of components included in the film attaching apparatus 100 in the second state (closed state) of the film attaching apparatus 100 according to an embodiment of the disclosure.

A method of adjusting the position of the jig 210 and devices for performing the same will be described using the embodiment illustrated in FIG. 3.

The electronic device 10 may be equipped with a seating jig 210 that may have various shapes and sizes according to an embodiment. An operation of attaching films to electronic devices 10 having various specifications may be performed using the film attaching apparatus 100 of the disclosure. To this end, the jig 210 may be replaced with another jig or a jig having the same size or a different size, depending on the embodiment.

First, when the specification of the electronic device is determined, a jig 210 having a shape and/or a size corresponding thereto may be disposed on one surface 202a of the base plate 202. The jig 210 disposed on the one surface 202a of the base plate 202 may be aligned using at least one position adjuster 240. For example, the position adjuster 240 may be configured with a micro gauge device. The position adjuster 240 may be in contact with at least a portion of the jig 210, and the position of the jig 210 may be slightly changed according to the driving of the position adjuster 240. According to various embodiments, a plurality of position adjusters 240 may be provided. For example, the film attaching apparatus 100 may include two position adjusters 240 in order to adjust the position of the jig 210 on the length direction (the X-axis direction) and/or width direction (the Y-axis direction) of the electronic device 10. As another example, as illustrated in FIG. 3, the film attaching apparatus 100 may include two position adjusters 240 disposed adjacent to opposite side ends of the jig 210 to change the position of the jig 210 on the length direction (the X-axis direction) of the electronic device 10, and one position adjuster 240 disposed adjacent to one end of the jig 210 in order to change the position of the jig 210 in the width direction (the Y-axis direction) of the electronic device 10. The number and arrangement of position adjusters 240 may be variously applied to each embodiment.

The film attaching apparatus 100 may further include support blocks 250. The support blocks 250 may be provided to support the jig 210 to correspond to the position adjusters 240, and the number and arrangement thereof may correspond to the number and arrangement of position adjusters 240. For example, in the film attaching apparatus 100, when a position adjuster 240 is provided on one side with respect to the jig 210, a support block 250 may be provided on the opposite side.

According to various embodiments, the film attaching apparatus 100 may additionally include a protection member 260 for protecting the jig 210 from impact. The protection member 260 may protrude from the one surface 202a of the base plate 202 in the height direction (e.g., the Z-axis direction in FIG. 1) of the electronic device 10 and may include an elastic material, thereby serving to protect the jig 210 from impact when the jig 210 is seated or attached/detached, or when the roller module 230 is driven. According to an embodiment, the protection member 260 may be omitted or may be provided at a position different from that illustrated in the drawing.

FIG. 4 may illustrate a state in which only a first cover is illustrated in a cover part for convenience of description of the operation of a roller module according to an embodiment of the disclosure.

Referring to FIG. 4, the roller module 230 provided in the film attaching apparatus 100 may move along the recess 202b at one end of the jig 210 and may move to the other end of the jig 210 by passing through the upper side of the display of the electronic device 10 mounted on the jig 210. A stopper 239 for limiting the movement of the roller module 230 may be provided on the top surface of the jig 210. For example, the roller module 230 may be moved from the state of being located outside one end of the jig 210 as illustrated in FIG. 3 to a position at which the stopper 239 is located as illustrated in FIG. 4, and may be stopped at the position. In this process, while the roller 233 may press the protective film against the display while rolling along the upper surface of the display.

Figure 5:
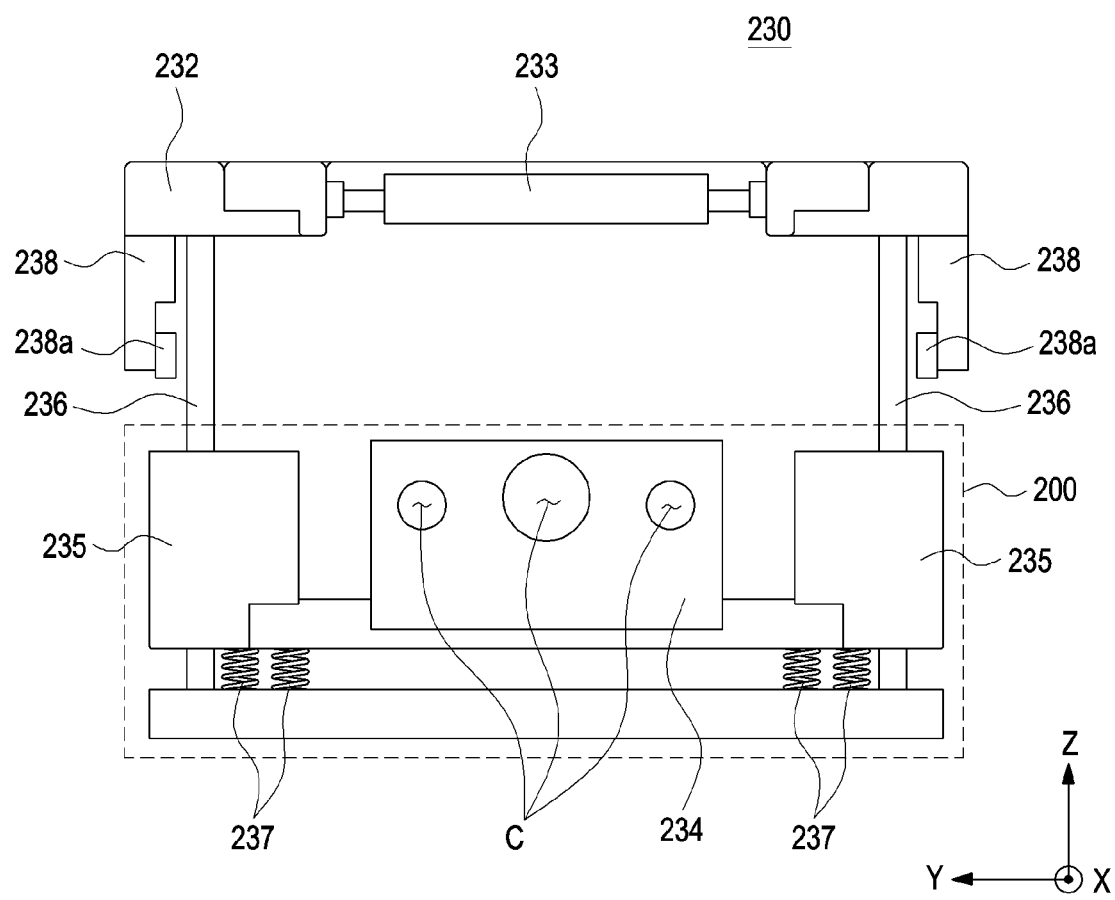
FIG. 5 is a view illustrating a roller module according to an embodiment of the disclosure.

FIG. 5 is a view illustrating a roller module according to an embodiment of the disclosure.

As illustrated in FIGS. 1 to 4, a portion of the roller module 230 may be exposed to the outside of the main body 200, and as illustrated in FIG. 5, another portion of the roller module 230 may be disposed in the inner space of the main body 200 and covered by the main body 200. FIG. 5 may illustrate a state of the roller module 230 viewed from one end surface of the film attaching apparatus 100.

Referring to FIG. 5, the roller module 230 may include a roller 233 and a guide block 232 configured to guide the rotation and movement of the roller. A roller 233 suitable for a shape and size corresponding to various specifications of the electronic device 10 and the display provided in the electronic device 10 may be used, and when the electronic device 10 is replaced, the roller 233 may also be replaced and used. According to various embodiments, the surface of the roller 233 may include an elastic member (e.g., a sponge). For example, when the elastic member (e.g., a sponge) is included on the surface of the roller 233, it may also be possible to press the film against the display including a curved portion using the roller 233. The guide block 232 may serve to transmit power to the roller 233 while supporting the roller 233 from at least one side thereof. According to an embodiment, at least one motor may be provided inside the guide block 232 to transmit power for rotating the roller 233 to the roller 233.

According to various embodiments, the roller module 230 may include a cylinder part 234, a driving part 235, and an elastic member 237. The roller module 230 may include a support column 236 that connects a portion disposed outside the main body 200 and a portion disposed inside the main body 200 to each other. According to an embodiment, the cylinder part 234, the driving part 235, and the elastic member 237 are disposed inside the main body 200 and may not be visually recognized from the outside. According to an embodiment, the cylinder part 234 may include at least one through hole C. The at least one through-hole C may be, for example, a through hole C for accommodating a shaft 204 extending in the length direction (e.g., the X-axis direction) of the film attaching apparatus 100 to be described later in the embodiment of FIG. 10, or a through hole C through which the fluid moves. For example, the cylinder part 234 is a component that substantially guides the movement of the roller module 230, and may be connected to the driving part 235. The driving part 235 is a component that provides power (forward/rearward power) for moving the roller module 230 in the length direction of the film attaching apparatus 100, and according to an embodiment, the driving part 235 may be a component for generating and/or adjusting hydraulic or pneumatic pressure to move the cylinder part 234 forward/rearward. The elastic member 237 may be provided to be coupled to one side of or the driving part 235 and supported by a structure included in the roller module 230. As the elastic member 237 is provided, it is possible to absorb an impact acting in the height direction (e.g., the Z-axis direction) of the film attaching apparatus 100 when the roller module 230 moves in the length direction (e.g., the X-axis direction) of the film attaching apparatus 100. As the elastic member 237 is provided, the impact applied to the display when the roller module 230 is driven can be reduced. The support column 236 may be provided through a recess (e.g., the recess 202b) provided in the top surface of the base plate (e.g., the base plate 202 in FIG. 1) of the main body 200 in order to connect a portion disposed outside the main body 200 and a portion disposed inside the main body 200 to each other.

The roller module 230 may include an overpressure prevention block 238 disposed under the guide block 232. The overpressure prevention block 238 may be a component that prevents the roller module 230 from being pressed by a force equal to or greater than a permitted force even when the film attaching apparatus 100 malfunctions or the roller module 230 is intentionally pushed by a force equal to or greater than the permitted force using a part of the body of a user (e.g., a hand). The overpressure prevention block 238 may be disposed under the guide block 232, and may be configured such that an end 238a of the overpressure prevention block 238 is brought into contact with the main body 200 when the roller module 230 is pushed downward (e.g., in the −Z-axis direction in FIG. 1). The roller module 230 may be movable by a predetermined distance in the height direction (e.g., the Z-axis direction in FIG. 1) of the film attaching apparatus 100 by the elastic member 237, and by including the overpressure prevention block 238, the distance over which the rollable module is movable can be limited.

According to an embodiment, the roller module 230, which includes guide blocks 232, a roller 233, a cylinder part 234, driving parts 235, support columns 236, and/or elastic members 237, may have a bilaterally symmetrical shape with respect to the roller 233, as illustrated in FIG. 5.

Figure 6:
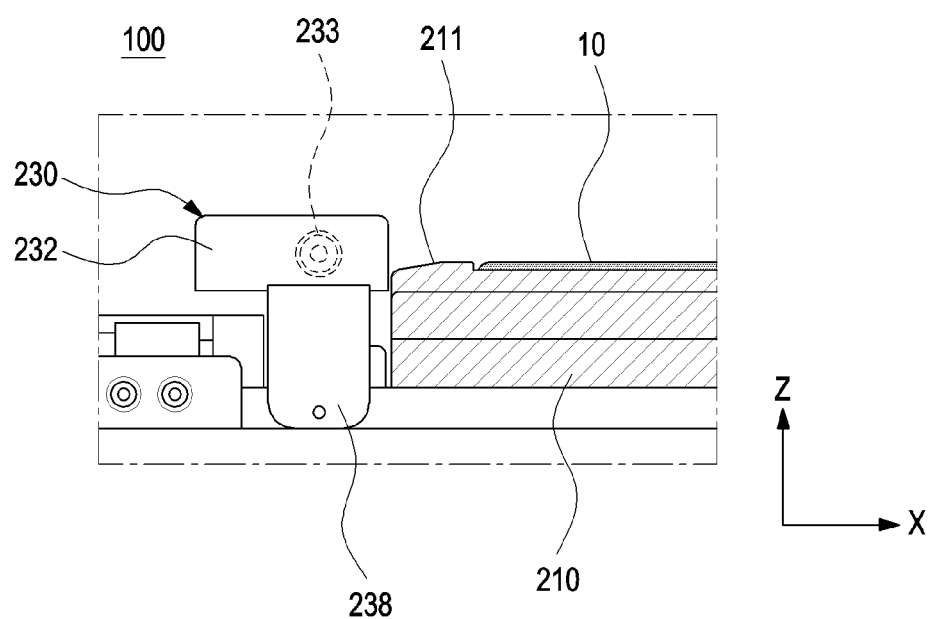
FIG. 6 is a side view illustrating the arrangement state of the roller module before the start of a film attaching operation, according to an embodiment of the disclosure.

FIG. 6 is a side view illustrating the arrangement state of a roller module before a start of a film attaching operation, according to an embodiment of the disclosure.

Figure 7A:
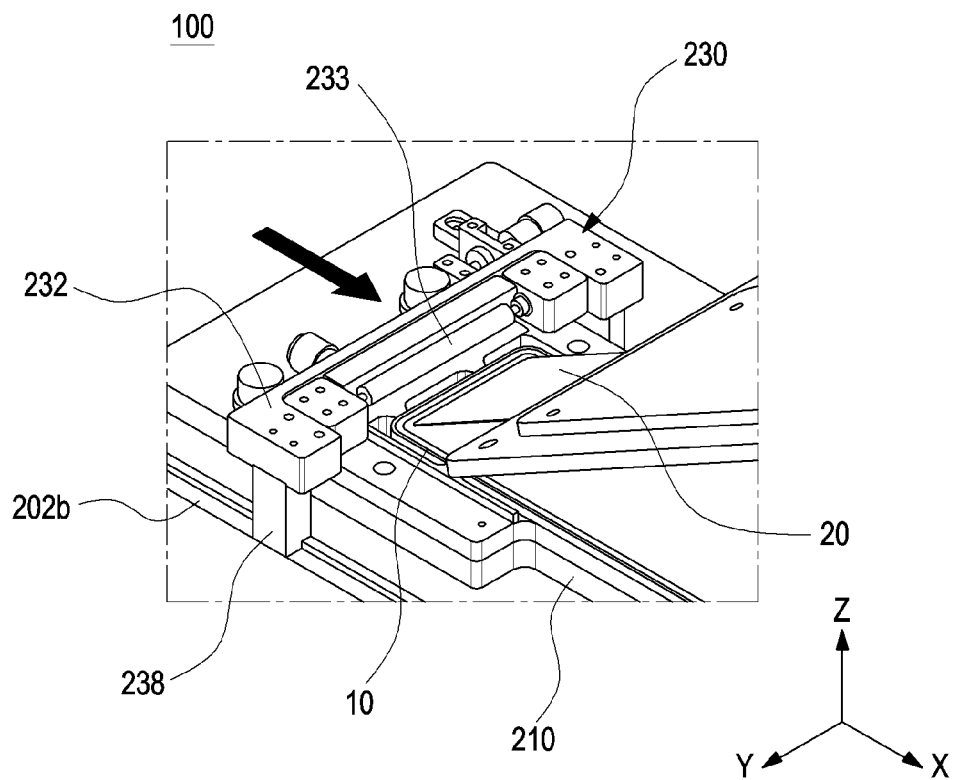
FIG. 7A is a perspective view illustrating the arrangement state of the roller module in a first step of the film attaching operation, according to an embodiment of the disclosure.

FIG. 7A is a perspective view illustrating the arrangement state of a roller module in a first step of a film attaching operation, according to an embodiment of the disclosure.

Figure 7B:
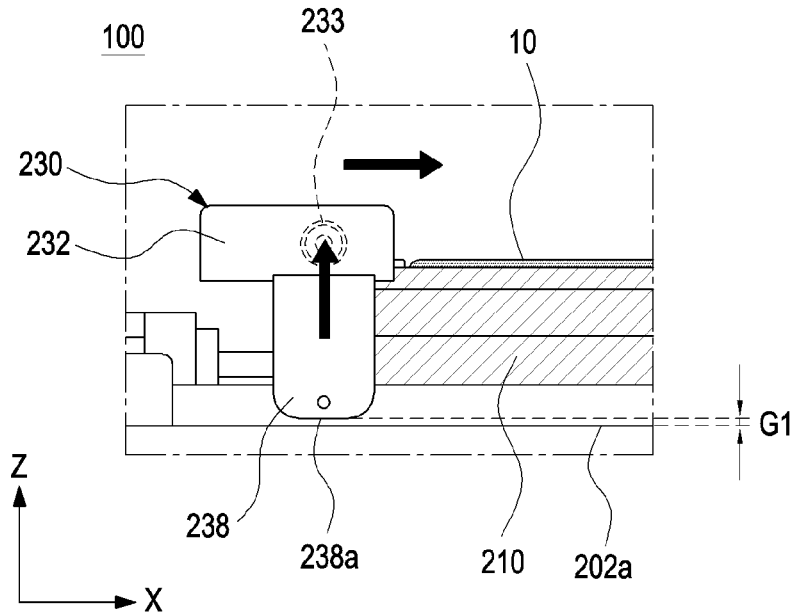
FIG. 7B is a side view illustrating the state of the roller module illustrated in FIG. 7A according to an embodiment of the disclosure.

FIG. 7B is a side view illustrating the state of the roller module illustrated in FIG. 7A according to an embodiment of the disclosure.

Figure 8A:
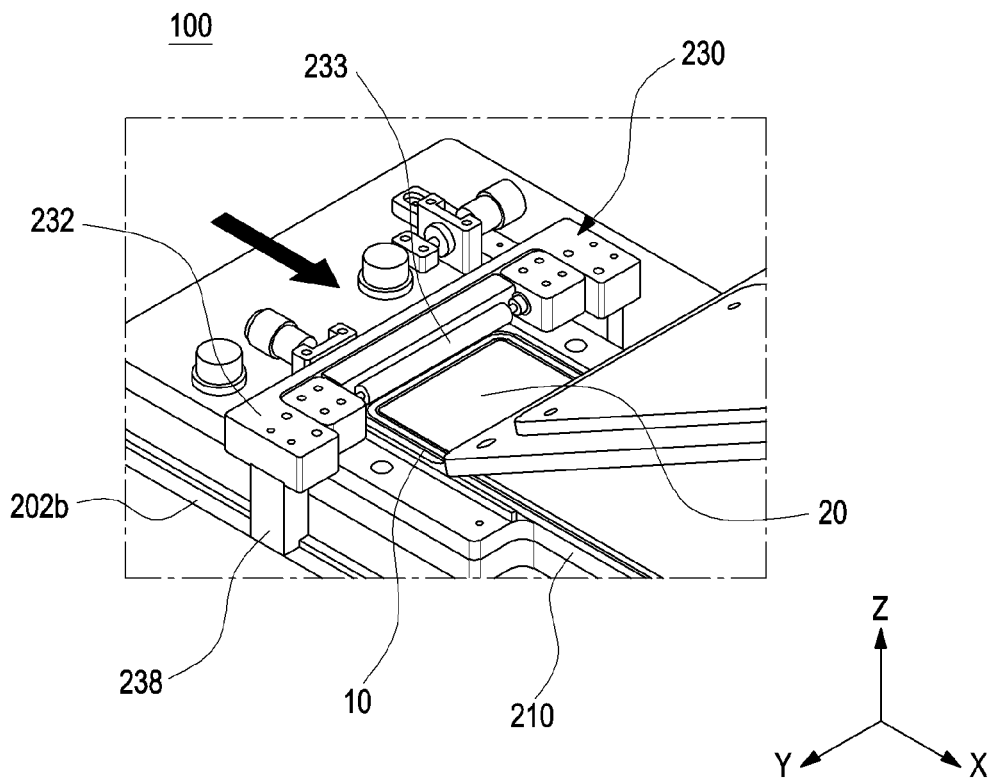
FIG. 8A is a perspective view illustrating the arrangement state of the roller module in a second step of the film attaching operation, according to an embodiment of the disclosure.

FIG. 8A is a perspective view illustrating an arrangement state of a roller module in a second step of a film attaching operation, according to an embodiment of the disclosure.

Figure 8B:
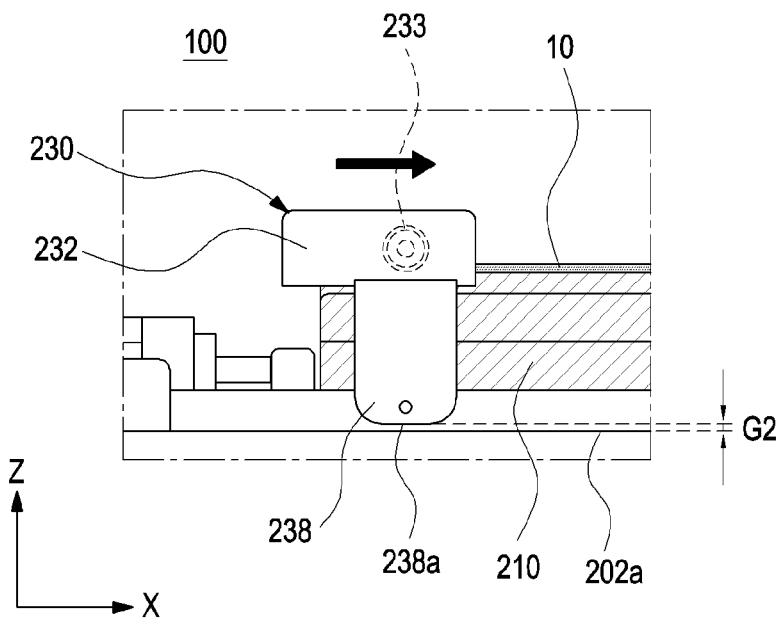
FIG. 8B is a side view illustrating the state of the roller module illustrated in FIG. 8A according to an embodiment of the disclosure.

FIG. 8B is a side view illustrating the state of the roller module illustrated in FIG. 8A according to an embodiment of the disclosure.

Figure 9A:
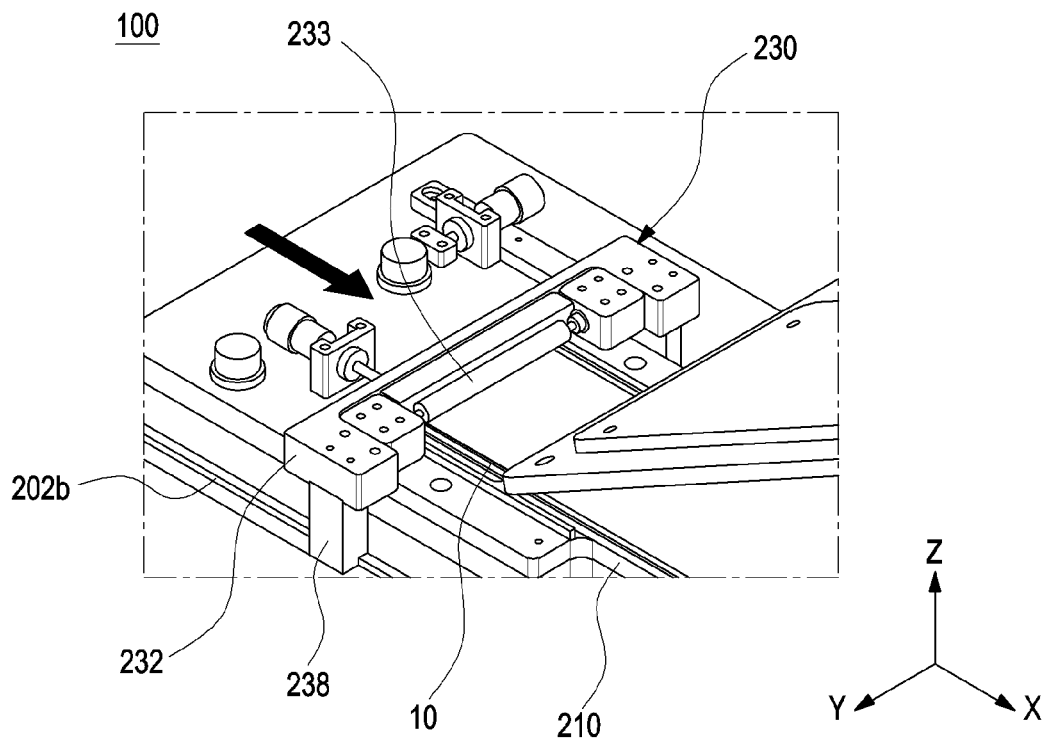
FIG. 9A is a perspective view illustrating the arrangement state of the roller module in the first step of the film attaching operation, according to an embodiment of the disclosure.

FIG. 9A is a perspective view illustrating an arrangement state of a roller module in a third step of a film attaching operation, according to an embodiment of the disclosure.

Figure 9B:
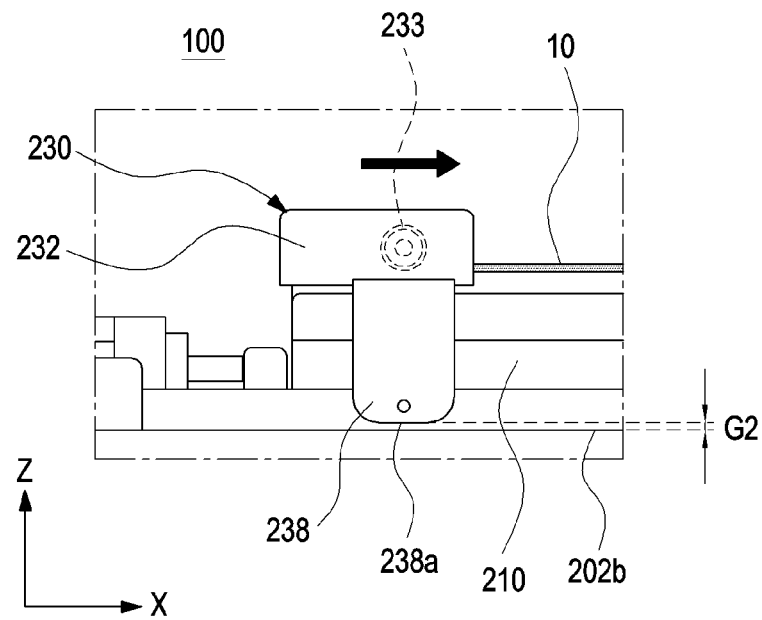
FIG. 9B is a side view illustrating the state of the roller module illustrated in FIG. 9A according to an embodiment of the disclosure.

FIG. 9B is a side view illustrating the state of the roller module 230 illustrated in FIG. 9A according to an embodiment of the disclosure.

An initial driving mechanism of the roller module 230 and an operating principle of the overpressure prevention block 238 will be described with reference to the embodiment illustrated in FIGS. 6, 7A, 7B, 8A, 8B, 9A, and 9B. Before describing the embodiment illustrated in FIGS. 6, 7A, 7B, 8A, 8B, 9A, and 9B, it shall be noted that the ordinal numbers included in the first step, the second step, and the third step are used only for the purpose of distinguishing different states in the film attaching operation.

Referring to FIG. 6, the roller module 230 may be disposed at a position adjacent to but spaced apart from the jig 210 before the start of the film attaching operation.

Referring to FIGS. 7A and 7B, with the start of the film attaching operation, the roller module 230 may move along the jig 210 and the top surface of the electronic device 10 seated on the jig 210 while the roller 233 is rotates, and the guide block 323 of the roller module 230 and/or the roller 233 may at least partially overlap the jig 210. The guide block 232 may guide the movement of the roller 233 such that the roller 233 supports rotation and moves in the length direction (the X-axis direction) of the electronic device 10. In this case, the roller 233 may press the display of the electronic device 10 with a constant force. According to various embodiments, the film attaching apparatus 100 may further include an air blower (not illustrated). The air blower may be operated simultaneously when or before the roller 233 rotates and moves to remove foreign matter present in the display on the top surface of the electronic device 10. According to an embodiment, the air blower may be integrated into the roller module 230 (e.g., in the roller 233) or provided as a separate component. According to an embodiment, an inclined surface 211 is provided in a portion adjacent to the initial position before pressing the roller 233 in the jig 210, which makes it easy for the guide block 232 and/or the roller 233 to at least partially overlap the jig 210. In this case, an end 238a of the overpressure prevention block 238 may be spaced apart from one surface 202a of the base plate by a first gap G1. Referring to FIGS. 8A and 8B, the roller module 230 will slide in a direction (e.g., the X-axis direction) for attaching the protective film 20 to the electronic device 10, and most of the guide block 232 and roller 233 of the roller module will overlap the electronic device 10. In this case, the end 238a of the overpressure prevention block 238 may be spaced apart from the one surface 202a of the base plate by a second gap G2. The second gap G2 in FIGS. 8A and 8B may be larger than the first gap G1. Referring to FIGS. 9A and 9B, the roller module 230 will further slide in the direction for attaching the protective film to the electronic device 10, and the guide block 232 and/or the roller 233 will both overlap the electronic device 10 on the top of the same. In this case, the end 238a of the overpressure prevention block 238 may maintain the second gap G2 with respect to the one surface 202a of the base plate. According to an embodiment, the second gap G2 may correspond to a maximum distance by which the overpressure prevention block 238 is movable in the height direction (e.g., the Z-axis direction) of the film attaching apparatus 100. For example, as the maximum distance by which the overpressure prevention block 238 is movable in the height direction (e.g., the Z-axis direction) of the film attaching apparatus 100, 0.5 mm may be set. Therefore, even when an external force equal to or greater than the permitted force acts on the roller module 230 when the roller module 230 slides, since the roller module 230 is movable only by the maximum distance (0.5 mm) of the overpressure prevention block 238, it is possible to prevent the roller 233 of the roller module 230 from pressing the display of the electronic device 10 by a force equal to or greater than the permitted force.

Figure 10:
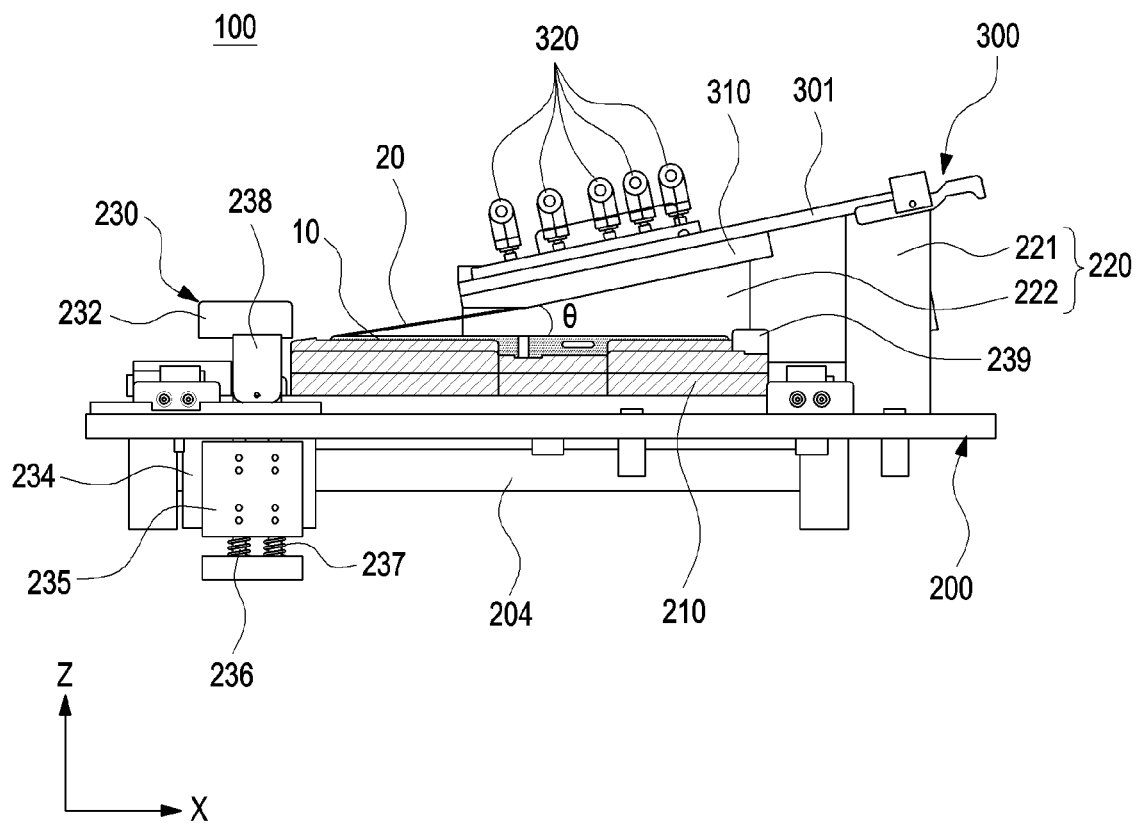
FIG. 10 is a view illustrating the arrangement state of components included in the film attaching apparatus before starting the film attaching operation, according to an embodiment of the disclosure.

FIG. 10 is a view illustrating an arrangement state of components included in a film attaching apparatus before starting a film attaching operation, according to an embodiment of the disclosure.

Figure 11:
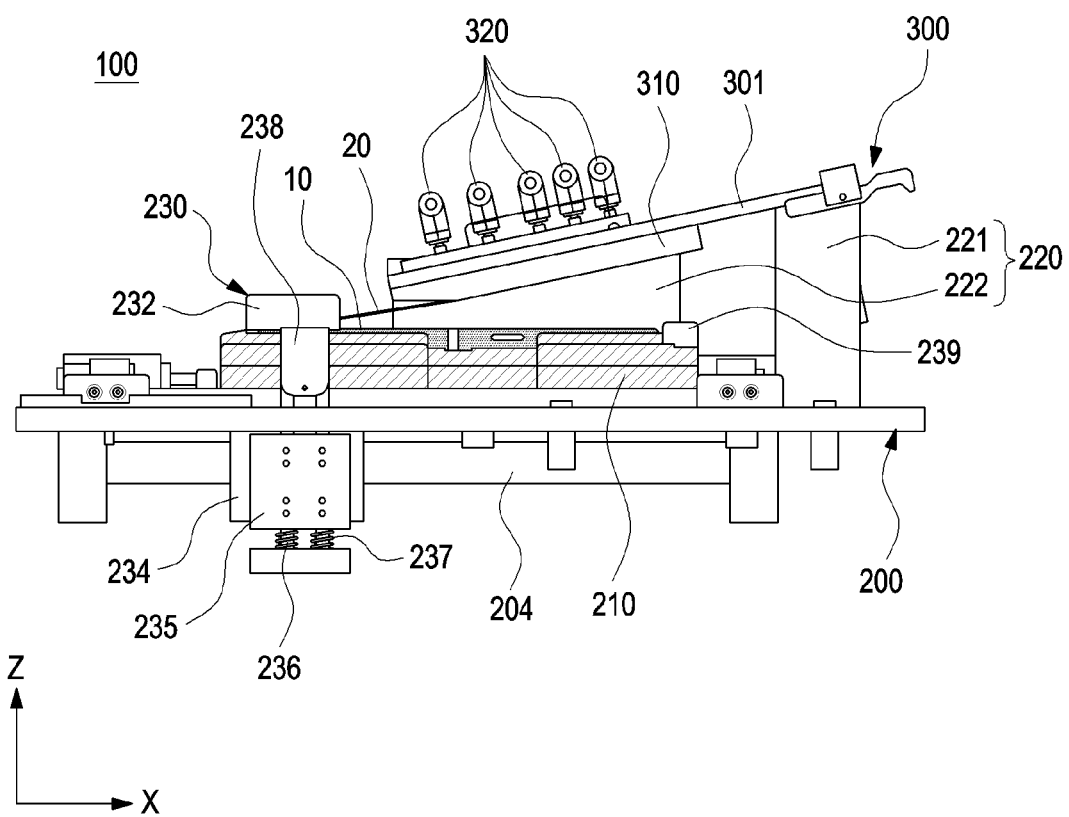
FIG. 11 is a view illustrating the arrangement state of components included in the film attaching apparatus in a fourth step of the film attaching operation, according to an embodiment of the disclosure.

FIG. 11 is a view illustrating an arrangement state of components included in a film attaching apparatus in a fourth step of a film attaching operation, according to an embodiment of the disclosure.

Figure 12:
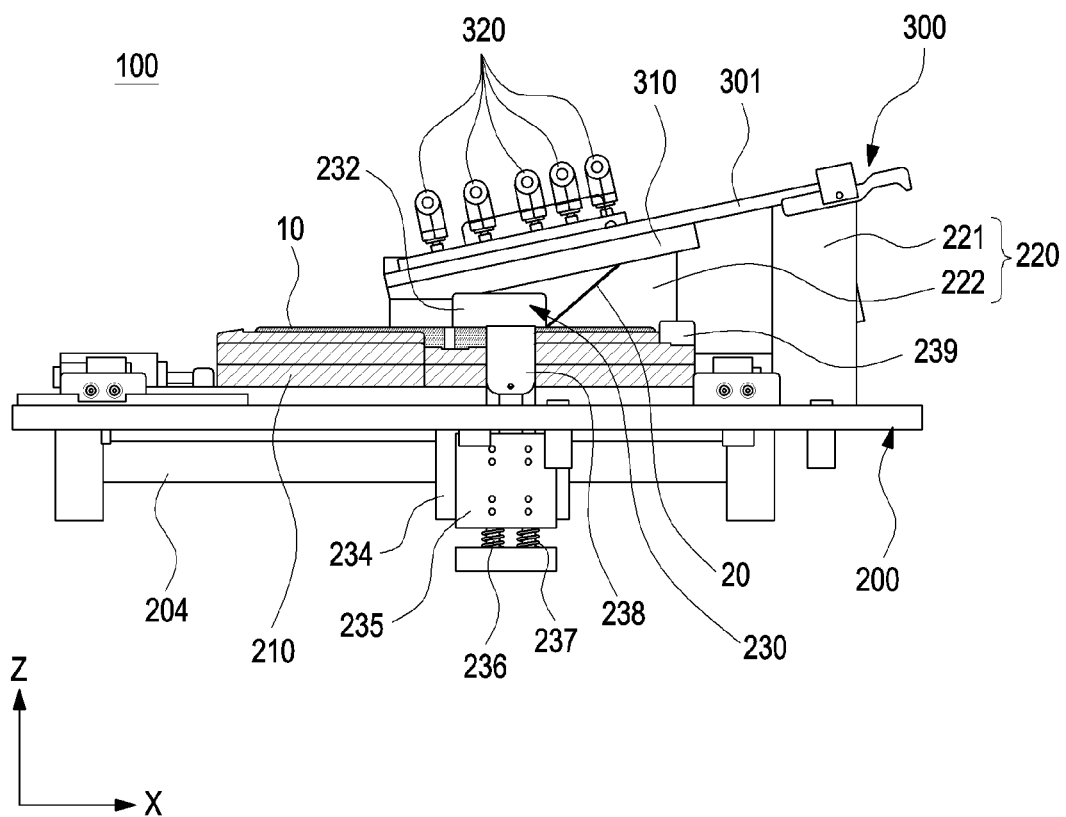
FIG. 12 is a view illustrating the arrangement state of components included in the film attaching apparatus in a fifth step of the film attaching operation, according to an embodiment of the disclosure.

FIG. 12 is a view illustrating an arrangement state of components included in a film attaching apparatus in a fifth step of a film attaching operation, according to an embodiment of the disclosure.

Figure 13:
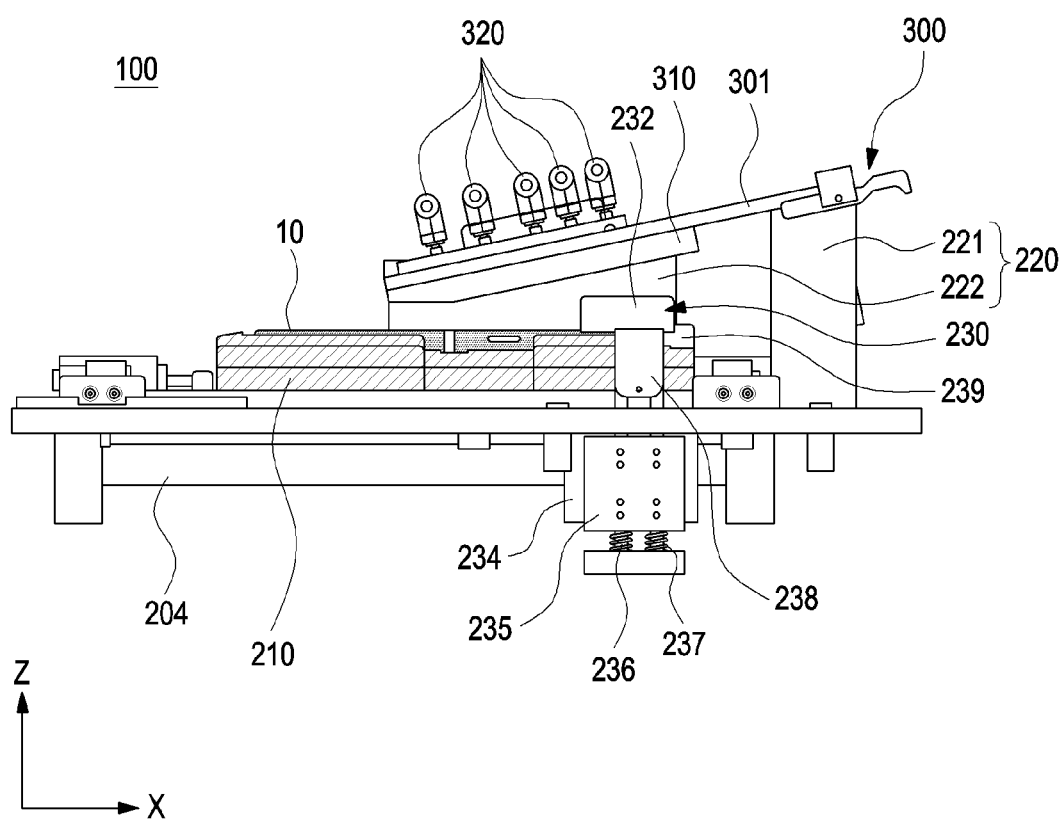
FIG. 13 is a view illustrating the arrangement state of components included in the film attaching apparatus in a sixth step of the film attaching operation, according to an embodiment of the disclosure.

FIG. 13 is a view illustrating an arrangement state of components included in a film attaching apparatus in a sixth step of a film attaching operation, according to an embodiment of the disclosure.

Before describing the embodiment illustrated in FIGS. 10 to 13, it shall be noted that the ordinal numbers included in the fourth step, the fifth step, and the sixth step are used only for the purpose of distinguishing different states in the film attaching operation. In the above-mentioned ordinal numbers, the order is arbitrarily determined according to the mentioned order and may be arbitrarily changed as necessary.

FIGS. 10 to 13 are views illustrating the film attaching apparatus 100 when a portion of the main body 200 (e.g., the base plate 202 in FIG. 1) and the cover part 300 are viewed from a lateral side.

The film attaching apparatus 100 may include a shaft 204 accommodated in the inner space of the main body 200. All the components of the roller module 230, including the guide block 232, the cylinder part 234, and the driving part 235, may slide along the shaft 204 extending in the length direction of the film attaching apparatus 100.

Referring to FIG. 10, before the film attaching operation starts, the protective film 20 and the display of the electronic device 10 may be in the state of being inclined by a predetermined angle θ. Here, the angle θ may be increased or decreased as needed. For example, when the display size of the electronic device 10 is large, the size of the protective film 20 to be attached to the display may also be increased. Accordingly, when the film is suctioned and fixed, sagging may occur in the protective film 20 having a size corresponding to the size of the display due to the weight of the protective film 20 itself. Thus, by increasing the fixed area of the display by increasing the film fixing angle θ as the size of the display becomes larger than a reference value, it is possible to prevent the sagging phenomenon of the film caused by the weight of the protective film 20 itself. For example, for a display having a first size, a protective film having a size corresponding thereto (hereinafter, referred to as a "first protective film") may be fixed to the film suction-fixing part 310 of the film attaching apparatus 100. In this case, the angle θ between the first protective film and the display of the electronic device 10 may be set to 12 degrees, and the suction area (or the fixed area) between the first protective film 20 and the film suction-fixing part 310 may occupy 60% of the total area of the protective film. As another example, for a display having a second size larger than the first size, a protective film having a size corresponding thereto (hereinafter, referred to as a "second protective film") may be fixed to the film suction-fixing part 310 of the film attaching apparatus 100. In this case, the angle θ between the second protective film and the display of the electronic device 10 may be set to 24 degrees, and the suction area (or the fixed area) between the second protective film 20 and the film suction-fixing part 310 may occupy 70% of the total area of the protective film. According to an embodiment, when adjusting the angle θ between the display and the protective film 20 fixed to the film suction-fixing part 310, the cover part 300 (or the film suction-fixing part 310) may be replaced according to the specification of the protective film. In addition to this, the inclined support part 220 may also be replaced.

Referring to FIGS. 11 to 13, the film attaching apparatus 100 may press the protective film 20 against the display of the electronic device 10 while all the components of the roller module 230 moves on the top surface of the electronic device 10. The roller module 230 rolls from one end of the protective film 20 while the cylinder part 234 moves forward, and the roller 233 basically pushes the protective film 20 in the direction of gravity (e.g., the −Z-axis axis direction) while pressing the protective film 20 so that the protective film 20 can be attached to the display of the electronic device 10. At this time, the protective film 20 is detached from the film suction-fixing part 310 while the roller module 230 is moving, and in the state in which the portion of the protective film 20 farthest from the roller module 230 is fixed, the protective film 20 may be sequentially detached and dropped from the portion close to the roller module 230 to be attached to the display.

As illustrated in FIG. 10, the roller module 230 may press the protective film 20 against the electronic device 10 while passing through the state according to the embodiment illustrated in FIGS. 11 to 13 from the state in which the roller module 230 is disposed at a position that is spaced apart from the jig 210 by a predetermined before starting the film attaching operation, the protective film 20. Then, the roller module 230 may move to a position at which the roller module 230 comes into contact with the stopper 239 and may then press the protective film 20 against the electronic device 10 once again while returning to the position illustrated in FIG. 10.

Figure 14:
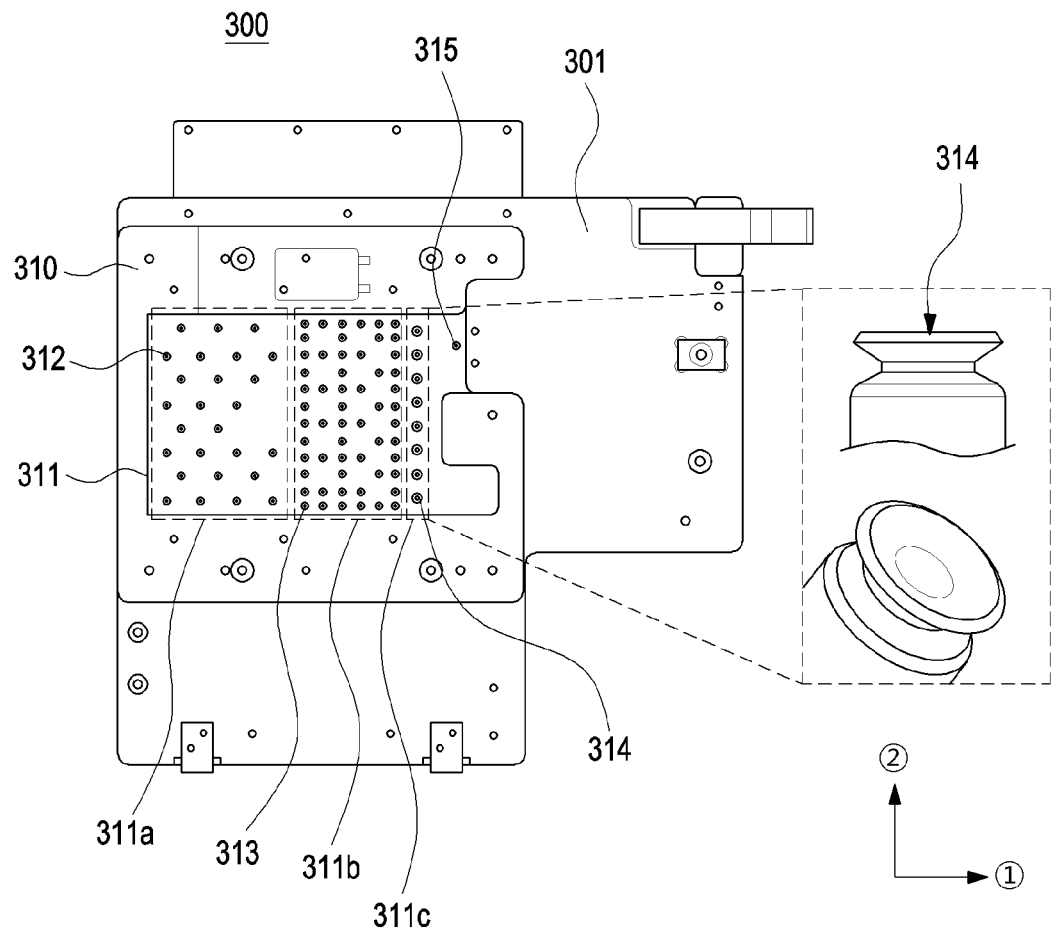
FIG. 14 is a view illustrating a cover part according to an embodiment of the disclosure.

FIG. 14 is a view illustrating a cover part according to an embodiment of the disclosure.

Figure 15:
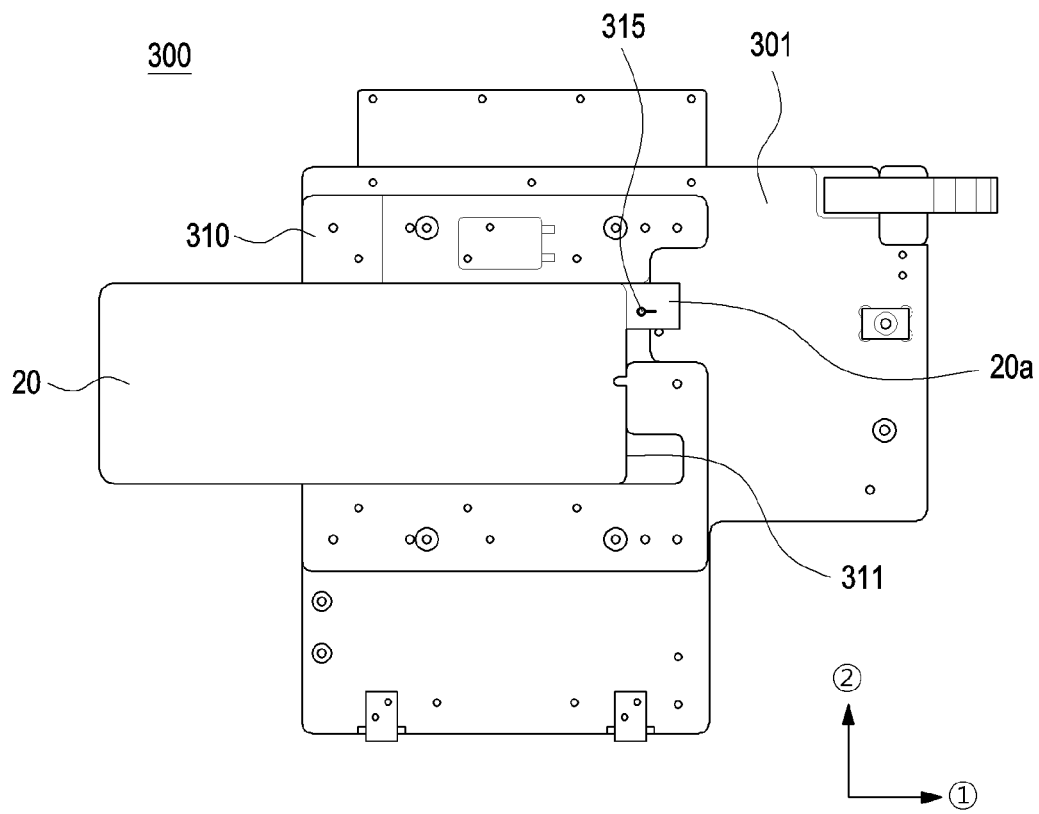
FIG. 15 is a front view illustrating a state in which a protective film is attached to the cover part according to an embodiment of the disclosure.

FIG. 15 is a front view illustrating a state in which a protective film is attached to a cover part, according to an embodiment of the disclosure.

Figure 16:
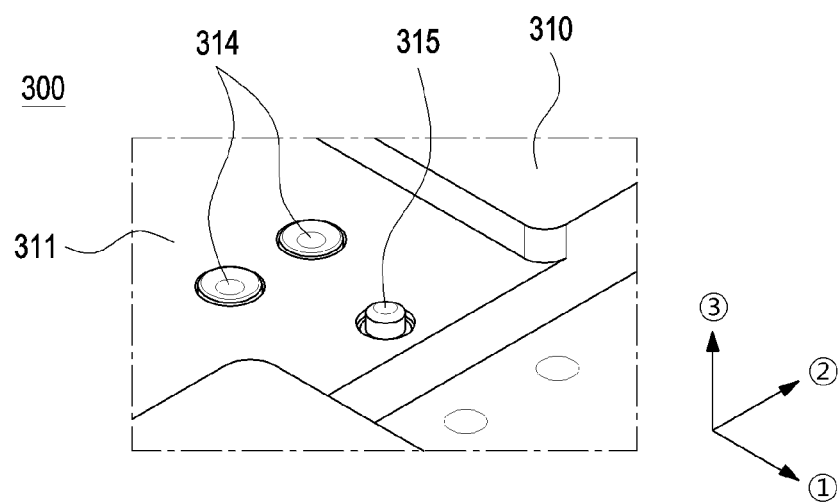
FIG. 16 is a perspective view illustrating a state in which the protective film is attached to the cover part, according to an embodiment of the disclosure.

FIG. 16 is a view illustrating a film bias prevention pin according to an embodiment of the disclosure.

Figure 17:
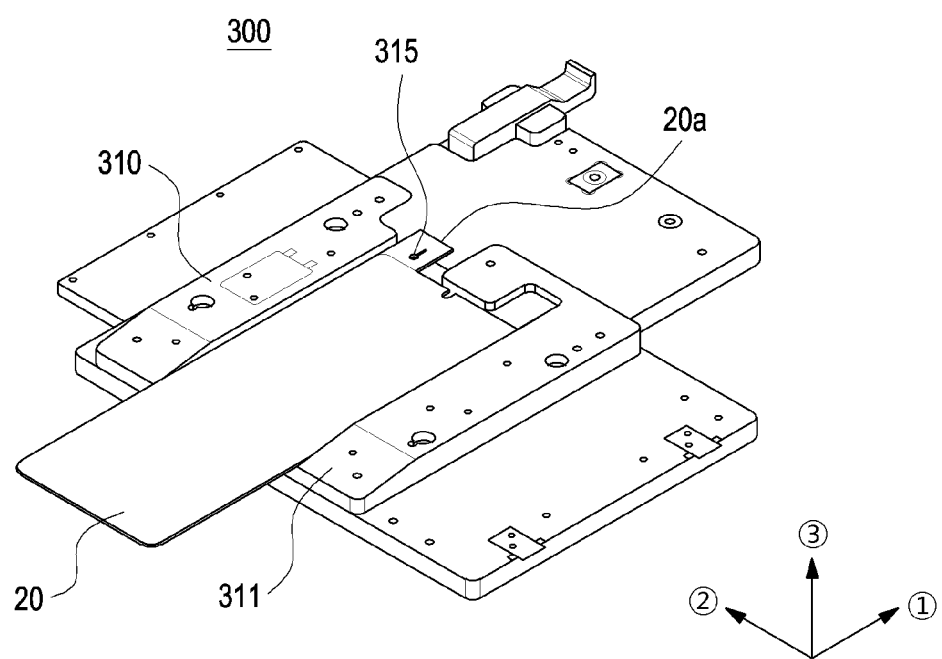
FIG. 17 is a view illustrating a film bias prevention pin according to an embodiment of the disclosure.

FIG. 17 is a perspective view illustrating a state in which the protective film is attached to a cover part, according to an embodiment of the disclosure.

FIGS. 14 to 17 illustrate a direction component ①, a direction component ②, and a direction component ③. The direction component ①, the direction component ②, and the direction component ③ may form a spatial coordinate system in which the components are orthogonal to each other. Here, the component direction ① may indicate the length direction of the protective film 20 mounted on the film suction-fixing part 310, the component direction ② may indicate the width direction of the protective film 20, and the direction component ③ may indicate the height (or thickness) direction of the protective film 20. The direction component ① may be oriented in a direction parallel to the direction component X illustrated in FIG. 1, and the direction component ② may be oriented in a direction parallel to the direction component Y illustrated in FIG. 1.

Referring to FIG. 14, the film suction-fixing part 310 may include a seating surface 311 disposed on one surface of the cover part 300. The seating surface 311 of the film suction-fixing part 310 may have a size smaller than that of the protective film 20. For example, when the protective film 20 is seated on the seating surface 311, at least a portion of the protective film 20 may protrude toward the outside of the seating surface 311. For example, as illustrated in FIG. 15, the seating surface 311 may have a fixed area of approximately 60% to 70% of the total area of the protective film 20. According to an embodiment, the fixed area of the seating surface 311 on which the protective film 20 is seated may be differently set according to the specifications of the electronic device 10 mounted on the film attaching apparatus 100 and the jig 210 corresponding to the electronic device 10. For example, in the case of an electronic device including a display having a relatively small size (e.g., 6.7 inches), the fixed area of the film (e.g., the first protective film) may be set to 60%. In addition, as another example, in the case of an electronic device including a relatively large size (e.g., 7.6 inches), the fixed area of the film (e.g., the second protective film) may be set to 70%.

The seating surface 311 of the film suction-fixing part 310 may include two or more divided suction areas which are sequentially arranged to the moving direction of the roller module (e.g., the roller module 230 in FIG. 1) and configured to have different suction forces, respectively. According to an embodiment, the two or more divided suction areas may include a first suction area 311a, a second suction area 311b, and a third suction area 311c as illustrated in FIG. 14. The first suction area 311a, the second suction area 311b, and the third suction area 311c may be configured to have different suction forces, respectively. According to an embodiment, the first suction area 311a, the second suction area 311b, and the third suction area 311c may be configured to have sequentially higher suction forces to correspond to the moving direction of the roller module 230. For example, the suction force of the second suction area 311b may be higher than that of the first suction area 311a, and the suction force of the third suction area 311c may be higher than that of the second suction area 311b.

The first suction area 311a, the second suction area 311b, and the third suction area 311c have first air suction holes 312, second air suction holes 313, and third air suction holes 314, respectively. The film suction-fixing part 310 may form a vacuum state or an exhaust state on the rear surface of the protective film 20 via a pneumatic control valve (e.g., the pneumatic control valve in FIG. 2) connected to the first air suction holes 312, the second air suction holes 313, and the third air suction holes 314.

According to an embodiment, the first air suction holes 312 and the second air suction holes 313 may be provided as air suction holes having substantially the same type and size, and the first suction area 311a and the second suction area 311b may have different suction forces depending on the areas and the numbers of air suction holes of respective suction areas. For example, the first suction area 311a may have an area larger than that of the second suction area 311b and the smaller number of air suction holes than that of the first suction area 311a, so that the suction force of the second suction area 311b may be lower than that of the first suction area 311a. Alternatively, the number of air suction holes provided in the second suction area 311b is relatively larger than the number of suction holes provided in the first suction area 311a (or provided at a higher density), so that the suction force of the second suction area 311b may be higher than that of the first suction area 311a. According to another embodiment, the first air suction holes 312 and the second air suction holes 313 may be formed of different types of air suction holes having different sizes. For example, the second air suction holes 313 may have a size relatively larger than that of the first air suction holes 312. The suction force of the second suction area 311b may be higher than that of the first suction area 311a by using the air suction holes as described above.

According to various embodiments of the disclosure, the suction area between the protective film 20 and the seating surface 311 may be gradually decreased as the protective film 20 is attached to the electronic device (e.g., the electronic device 10 in FIG. 1) by the movement of the roller module 230 in the film attaching operation. Even if the suction area of the film is gradually reduced in the film attaching operation, the second suction area 311b may provide a suction force equal to or higher than a critical point by having a higher adsorption force than that of the first suction area 311a. Due to this, the sequential detaching operation of the protective film 20 from the seating surface 311 may be performed more smoothly.

According to various embodiments, the third air suction holes 314 may further include adsorption pads, respectively. The third air suction holes 314 further including suction pads may provide a higher suction force than the air suction holes that do not include suction pads. For example, the third air suction holes 314 may have the strongest suction force among the first air suction holes 312, the second air suction holes 313, and the third air suction holes 314.

As described above, by dividing the suction section of the protective film 20 into a plurality of zones, the film suction-fixing part 310 may sequentially release the suction of the protective film 20 while maintaining the fixing force for the protective film 20 up to the end of the attaching process, whereby it is possible to minimize the generation of air bubbles during attachment while preventing the drop of the film.

According to various embodiments, referring to FIGS. 16 and 17, the film suction-fixing part 310 may further include a film bias prevention pin 315. For example, the film bias prevention pin 315 may be provided to pass through a hole provided in a handle portion 20a of the protective film 20. When the protective film 20 is seated on the film suction-fixing part 310, the film bias prevention pin 315 is penetrated and fixed in the hole provided in the handle portion 20a of the protective film 20, whereby it is possible to prevent bias during the operation of attaching the protective film 20 to the display of the electronic device.

Hereinafter, a method of attaching a film using the film attaching apparatus 100 of the disclosure will be described in detail.

FIGS. 18A, 18B, 18C, 18D, 18E, 18F, 18G, and 18H are views illustrating a method of attaching a film according to various embodiments of the disclosure.

Figure 18A:
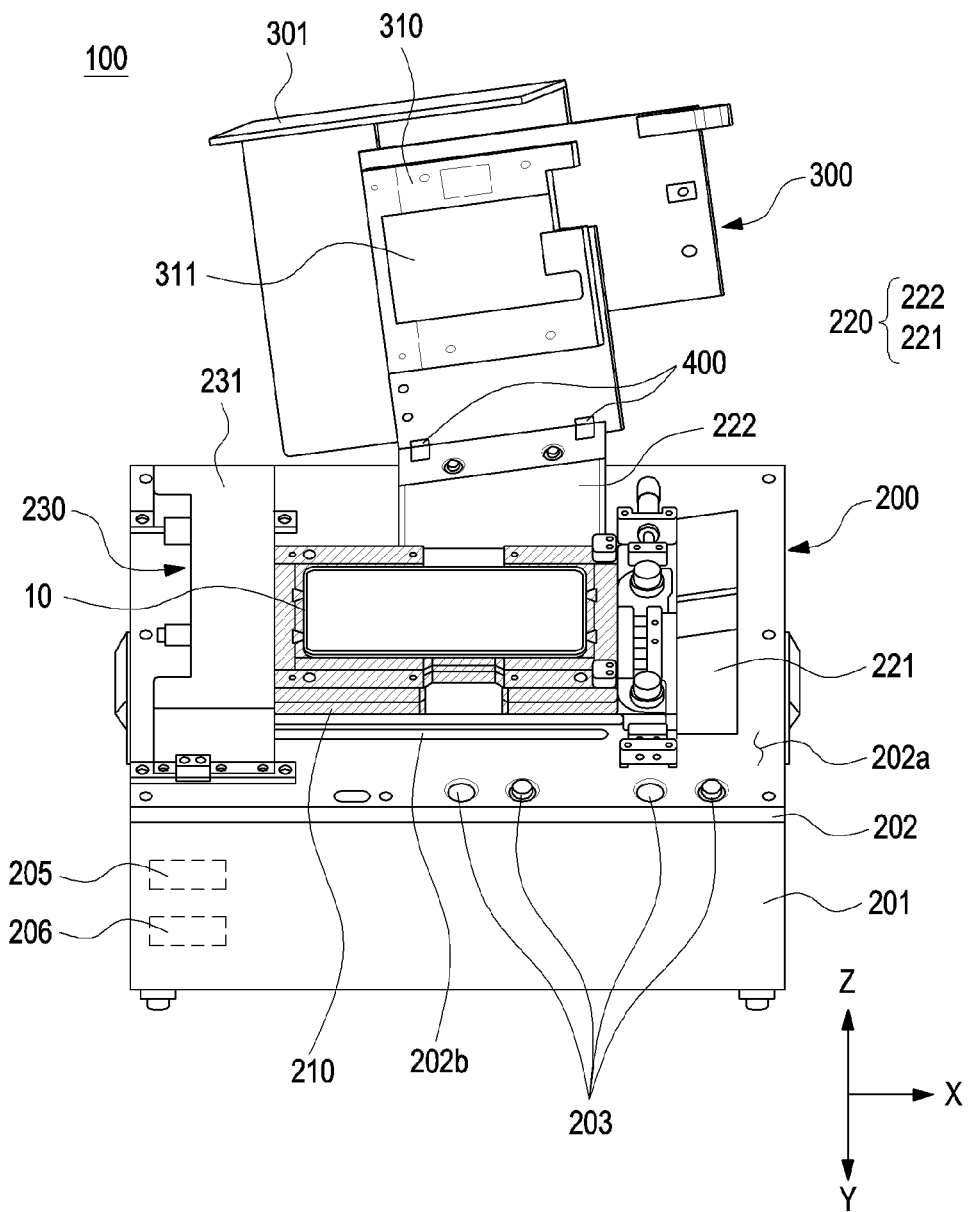
FIGS. 18A, 18B, 18C, 18D, 18E, 18F, 18G, and 18H are views illustrating a method of attaching a film according to various embodiments of the disclosure.

Referring to FIG. 18A, the film attaching apparatus 100 may include a main body 200 and a cover part 300. The main body 200 may include a controller 201 and a base plate 202 provided on one surface of the controller 201. The cover part 300 may include a cover 301 and a film suction-fixing part 310 provided on the inner surface of the cover 301. A jig 210 for seating the electronic device 10 may be disposed on one surface 202a of the base plate 202, and inclined support parts 221 and 222 for mounting the film suction-fixing part 310 to be inclined at a predetermined angle may be disposed around the jig 210. The film attaching apparatus 100 may be utilized as a common attachment apparatus in which electronic devices of various specifications and jigs corresponding thereto can be mounted thereto.

Figure 18B:
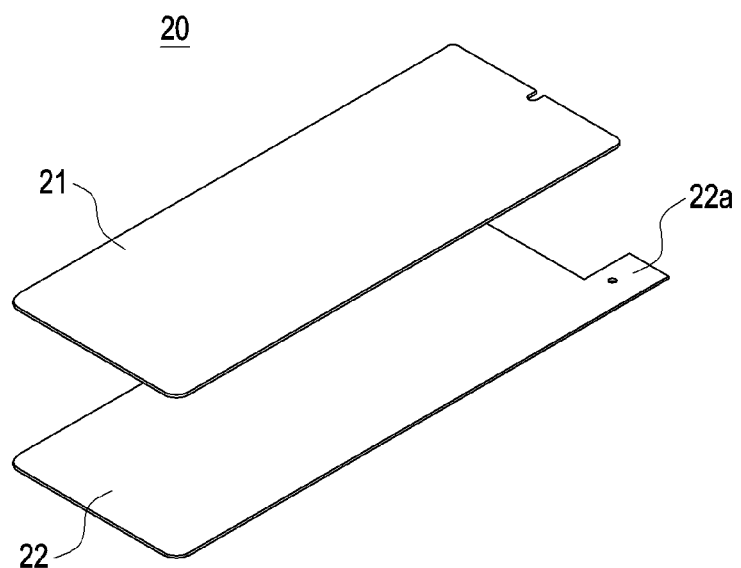

Referring to FIGS. 18A and 18B together, the protective film 20 may be used in the state of being mounted on the seating surface 311 of the film suction-fixing part 310. The protective film 20 is a sheet made of a protective film of a flexible, elastic and stretchable material (e.g., urethane, thermoplastic polyurethane (TPU), or polyethylene terephthalate (PET)) and may include a sheet 21 and a first release paper 22 disposed on one surface of the sheet 21. A handle portion 22a is provided on the first release paper 22 to prevent bias when the protective film 20 is attached to the seating surface 311 of the film suction-fixing part 310. According to an embodiment, the user may initiate the film attaching operation after seating the electronic device 10 on the jig 210 in the state in which the film attaching apparatus 100 is opened, seating the protective film 20 on the film suction-fixing part 310, and then aligning the electronic device 10 and the protective film 20 to each other using the position adjuster (e.g., the position adjuster 240 in FIG. 3). When the protective film 20 is seated on the film suction-fixing part 310, it is possible to fix the protective film 20 by pushing a suction button among buttons 203 to make the pneumatic control valve attaching apparatus in a vacuum state so that the protective film 20 is suctioned. After the protective film 20 is seated on the film suction-fixing part 310, the first release paper 22 may be separated and removed from the sheet 21 by holding the handle portion 22a of the first release paper 22.

Figure 18C:
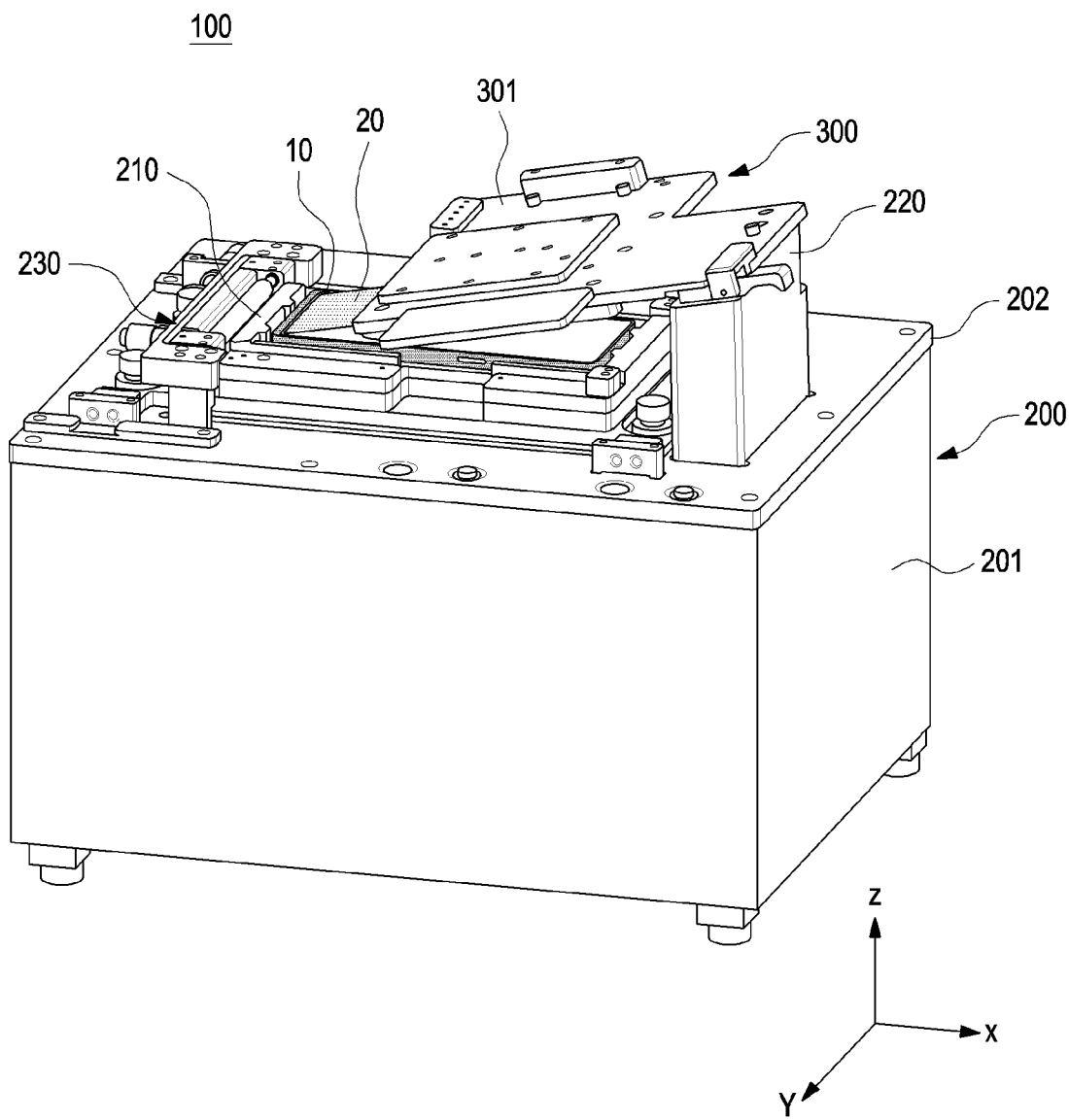
Figure 18D:
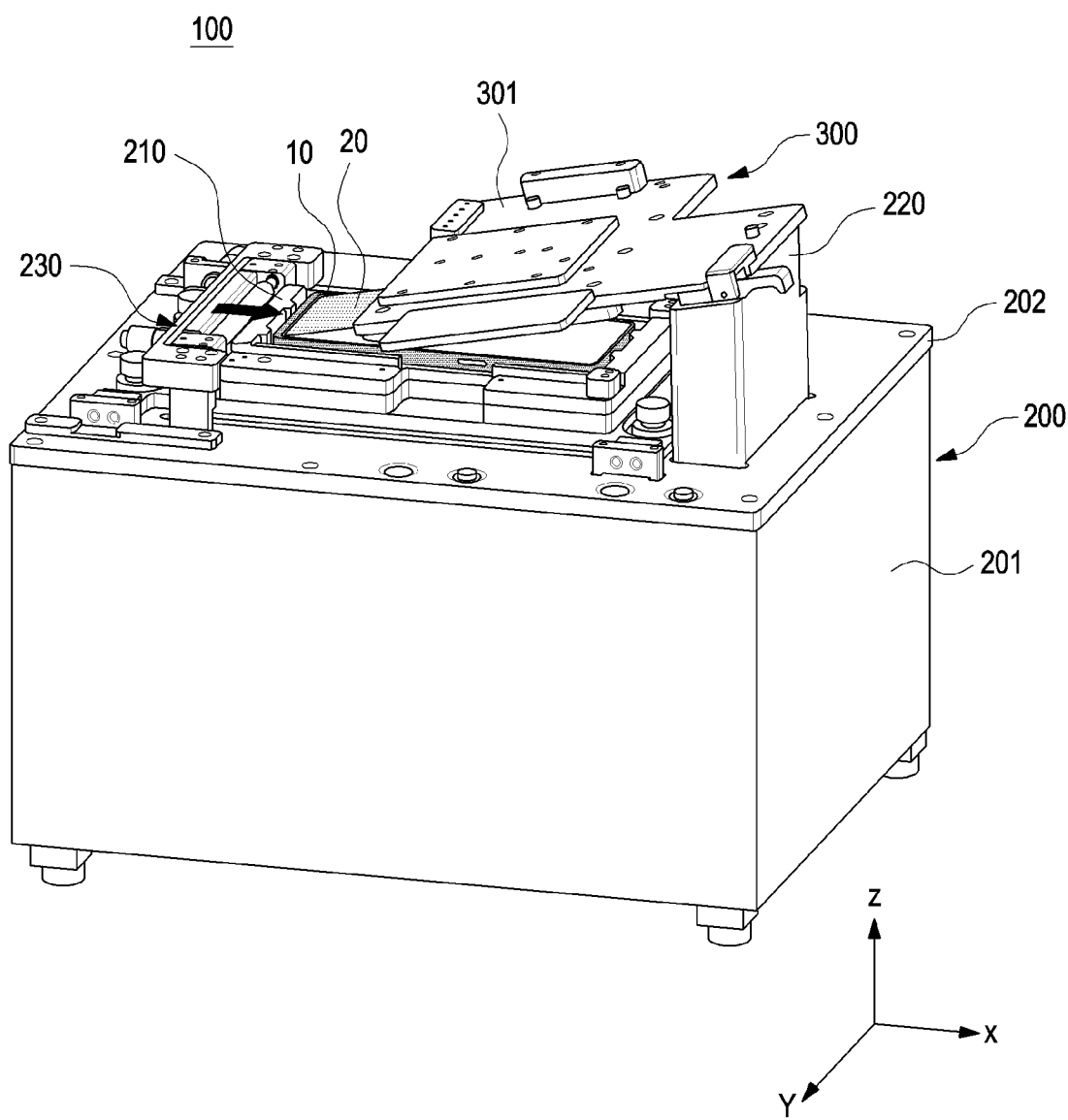
Figure 18E:
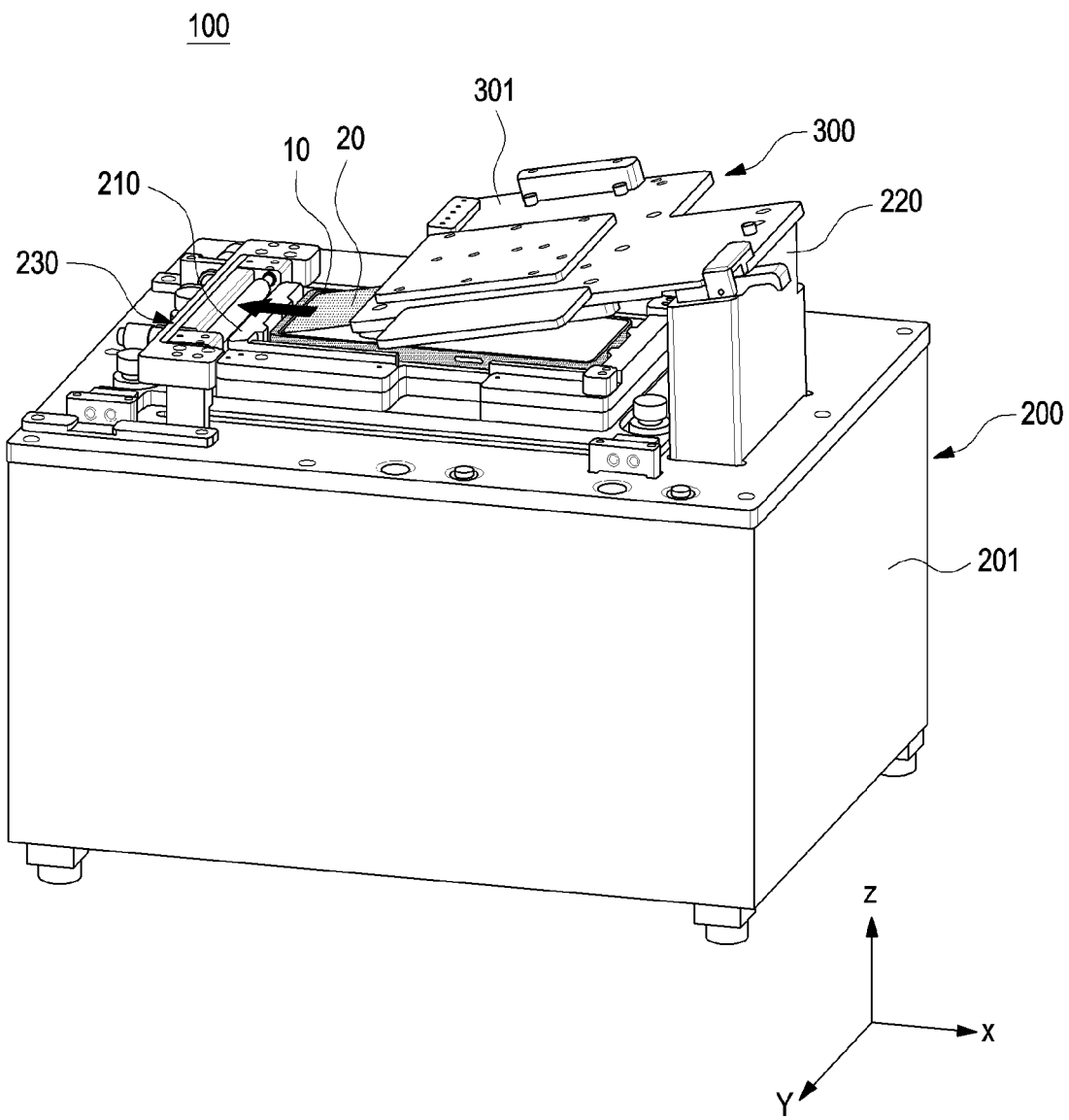

Referring to FIGS. 18C to 18E, according to an embodiment, it is possible to drive the roller module 230 by pushing the buttons 203 after covering the cover part 300 to form the film attaching apparatus 100 in a closed state. The roller module 230 may be controlled by the processor 205 to be driven forward and rearward in the length direction of the film attaching apparatus 100, and through this process, the protective film 20 may drop from the film suction-fixing part 310 to be attached to the display of the electronic device 10. According to an embodiment, when the user pushes the start button, the roller module 230 may roll from one end of the protective film 20 to move until the roller module 230 comes into contact with the stopper 239 of the jig 210 while attaching the protective film 20 to the display. At this time, the pneumatic control valve 320 may make the suction area between the protective film 20 and the seating surface 311 of the film suction-fixing part 310 sequentially in an evacuated state from a vacuum state to drop the protective film 20 from an end thereof. In addition, the roller module 230 may return to the original position thereof while rolling again from the other end of the protective film 20 to press the protective film 20 against the display again.

Figure 18F:
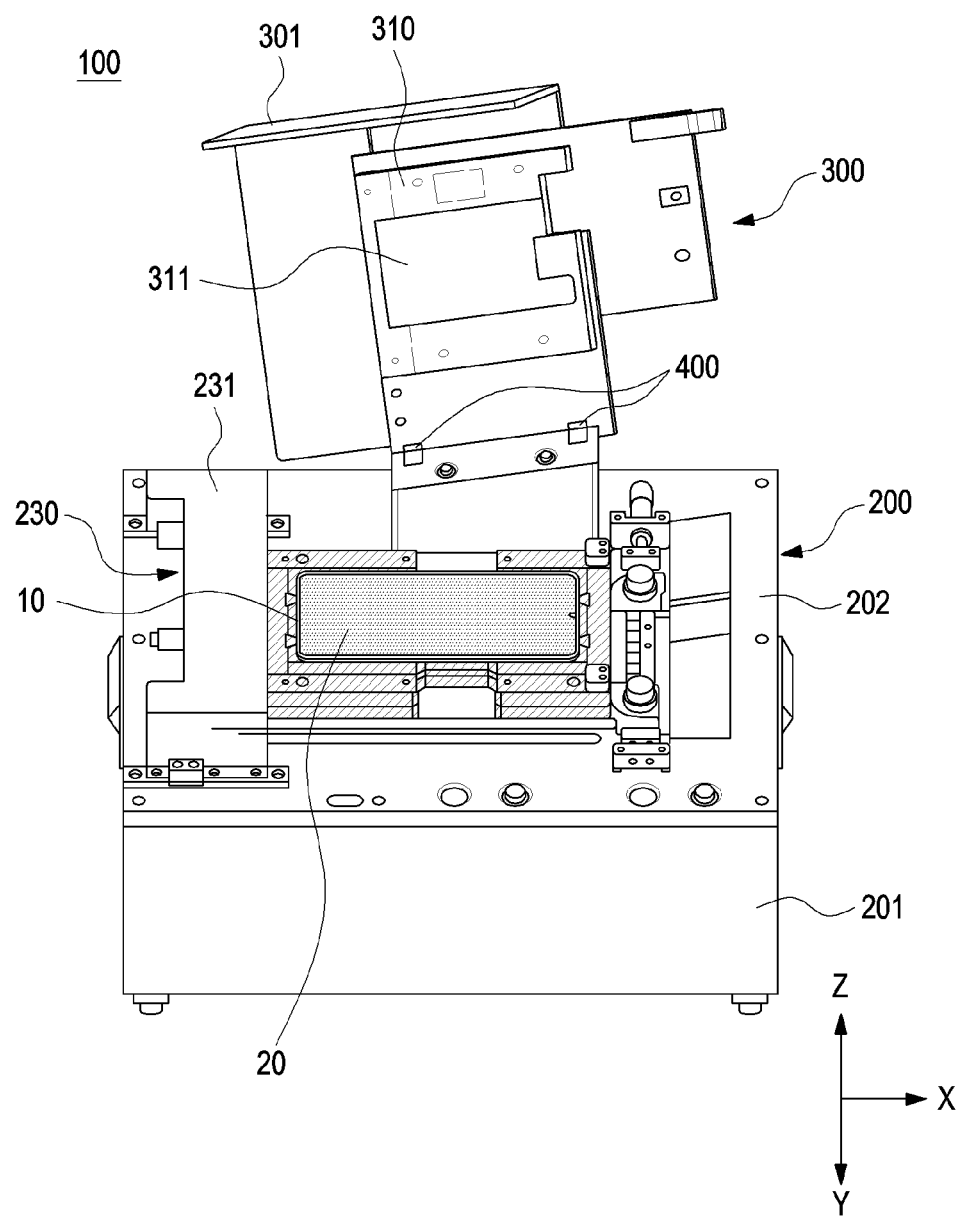
Figure 18G:
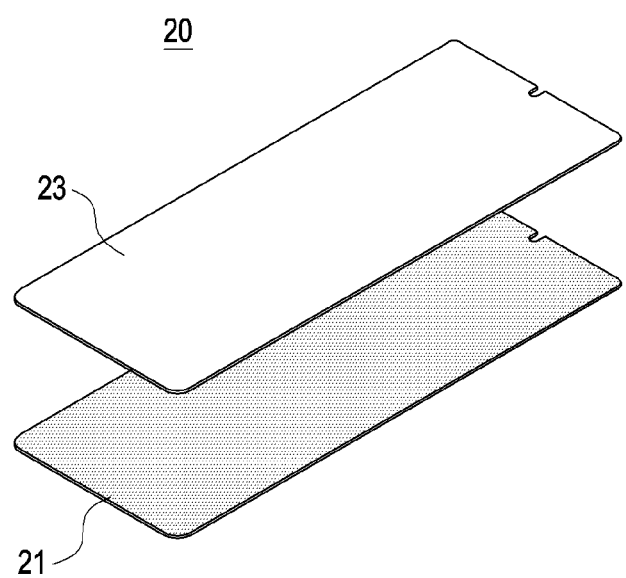
Figure 18H:
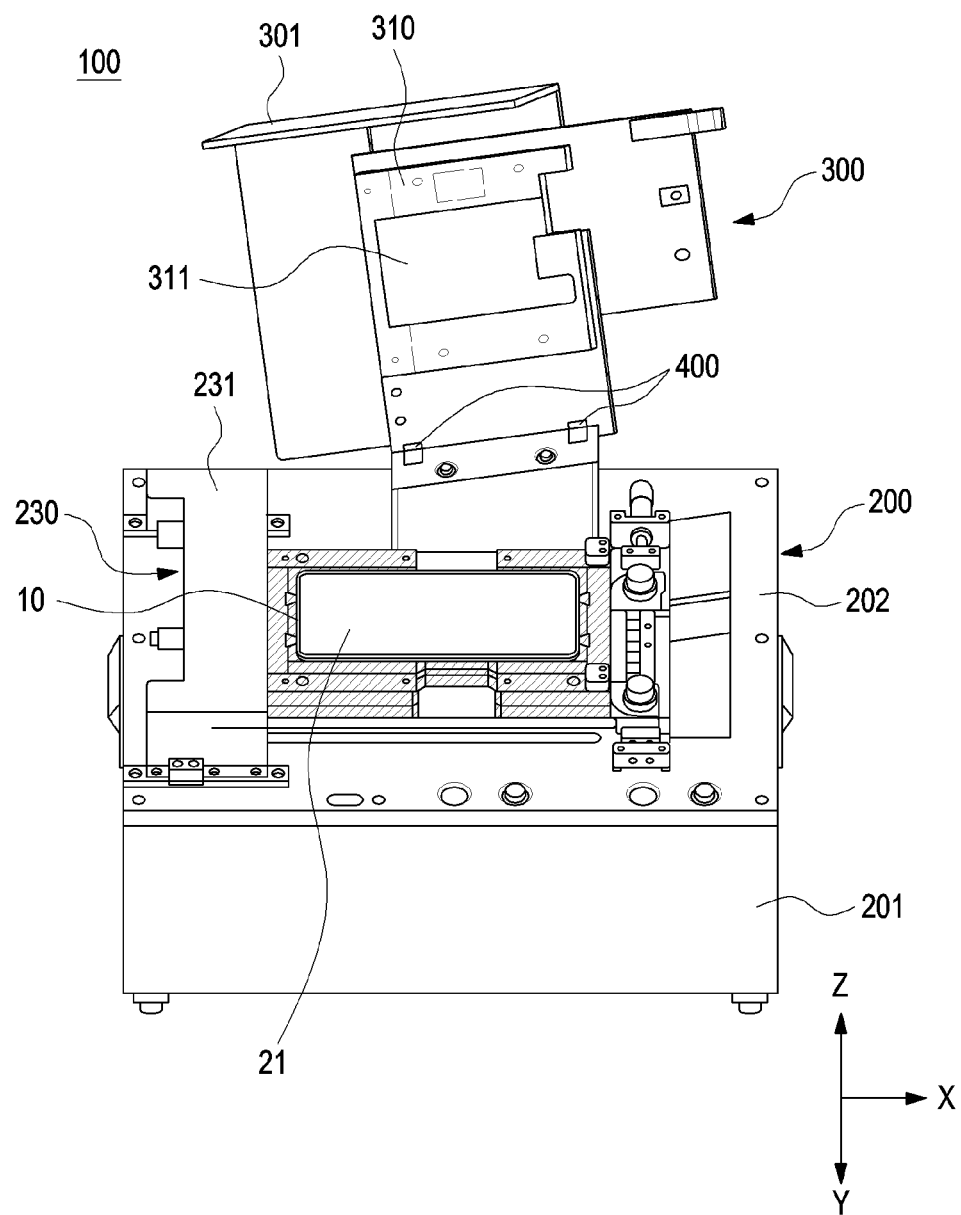

Referring to FIGS. 18F to 18H, according to an embodiment, when the protective film 20 is attached to the display of the electronic device 10, the film attaching apparatus 100 may be opened again. In the protective film 20 attached to the display of the electronic device 10, a second release paper 23 may be attached to the other surface of the sheet 21. Accordingly, the user may separate and remove the second release paper 23 attached to the other surface of the sheet 21 using a separate removal means (e.g., a removal tape). According to the embodiment illustrated in FIG. 18H, an electronic device 10 including a display on which the sheet 21 are stacked may be provided.

In summary, through the above-described embodiments, it is possible to provide a film attaching apparatus 100 for attaching a film including a flexible, elastic and stretchable material (e.g., urethane, thermoplastic polyurethane (TPU), or polyethylene terephthalate (PET)) applicable to an electronic device (e.g., a foldable electronic device). According to the film attaching apparatus 100 of the disclosure, it is possible to prevent occurrence of a defect in the form of a comb pattern or in the form of a wrinkle in a protective film, which may occur in the film due to an external force at the time of performing an operation of attaching the film in a conventional operation of attaching a 3D protective film (e.g., a method of attaching a protective film using a roller in the state in which the upper and lower ends of the protective film are caught and fixed to a jig).

According to various embodiments of the disclosure, a film attaching apparatus (e.g., the film attaching apparatus 100 in FIG. 1) for attaching a film to an electronic device (e.g., the electronic device 10 in FIG. 1) including a display may include: a main body (e.g., the main body 200 in FIG. 1) including a base plate (e.g., the base plate 202 in FIG. 1); a jig (e.g., the jig 210 in FIG. 1) disposed on the base plate and configured to seat an electronic device thereon; a film suction-fixing part (e.g., the film suction-fixing part 310 in FIG. 1) inclined at a predetermined angle with respect to the jig; and a roller module (e.g., the roller module 230 in FIG. 1) disposed on the base plate and configured to be slidable above the jig, wherein the film suction-fixing part may include two or more divided suction areas (e.g., the suction areas 311a to 311c in FIG. 14) which are sequentially arranged to correspond to a moving direction of the roller module and configured to have different suction forces, respectively.

According to various embodiments, the suction areas may include a first suction area (e.g., the first suction area 311a in FIG. 14), a second suction area (e.g., the second suction area 311b in FIG. 14), and a third suction area (e.g., the third suction area 311c in FIG. 14).

According to various embodiments, the first suction area, the second suction area, and the third suction area may be configured to have suction forces that become sequentially higher to correspond to the moving direction of the roller.

According to various embodiments, the first suction area, the second suction area, and the third suction area may include a first air suction hole, a second air suction hole, and a third air suction hole, respectively.

According to various embodiments, the third air suction hole may further include a suction pad.

According to various embodiments, the film suction-fixing part may include a seating surface on which the first suction area, the second suction area, and the third suction area are provided, and the seating surface may be configured to have a size of 60% to 70% of a total area of the film.

According to various embodiments, at least one inclined support part (e.g., the inclined support part 220 in FIG. 1) disposed on base plate and configured to support thereon the film suction-fixing part to be inclined at a predetermined angle with respect to the seating jig may be included.

According to various embodiments, at least one position adjuster (e.g., the position adjuster 240 in FIG. 3) and at least one support block (e.g., the support block 250 in FIG. 3), which are disposed on the base plate to adjust the position of the jig may be included.

According to various embodiments, the roller module may include: the roller (e.g., the roller 233 in FIG. 5); a guide block (e.g., the guide block 232 in FIG. 5) configured to guide the rotation and movement of the roller; and a cylinder part (e.g., the cylinder part 234 in FIG. 5) and a driving part (e.g., the driving part 235 in FIG. 5) configured to move the roller module in the length direction of the film attaching apparatus.

According to various embodiments, the roller module may further include an overpressure prevention block (e.g., the overpressure prevention block 238 in FIG. 5) disposed under the guide block.

According to various embodiments, the overpressure prevention block may be configured to have a gap from one surface of the base plate to a predetermined height (e.g., 0.5 mm) under the guide block.

According to various embodiments, the jig may include an inclined surface provided in a portion adjacent to an initial position before pressing the roller of the roller module.

According to various embodiments, the jig may be provided with a stopper (e.g., the stopper 239 in FIG. 3) configured to restrict the movement of the roller module at one side end thereof.

According to various embodiments, the electronic device may include a flexible display.

According to various embodiments, the film attached to the flexible display may be made of a flexible, elastic and stretchable material.

According to various embodiments, the flexible, elastic and stretchable material may be urethane, thermoplastic polyurethane (TPU), or polyethylene terephthalate (PET).

According to various embodiments of the disclosure, a film attaching apparatus for attaching a film to a foldable electronic device including a flexible display may include: a main body including a base plate; a jig disposed on the base plate and configured to seat thereon the electronic device disposed on the base plate; at least one inclined support part disposed on the base plate; a cover part connected to the inclined support part by a hinge structure and configured to cover the jig by an opening and closing operation; a film suction-fixing part disposed on one surface of the cover part and configured to be capable of suctioning and removing the film in a state of being inclined at a predetermined angle with respect to the jig; and a roller module disposed on the base plate and including a roller slidable above the jig, wherein the film suction-fixing part may include a first suction area, a second suction area, and a third suction area sequentially disposed to correspond to the moving direction of the roller module.

According to various embodiments, the first suction area, the second suction area, and the third suction area may be configured to have suction forces that become sequentially higher to correspond to the moving direction of the roller.

According to various embodiments, the first suction area, the second suction area, and the third suction area each may include a first air suction hole, a second air suction hole, and a third air suction hole, respectively, and the third air suction hole may further include a suction pad.

According to various embodiments, the roller module may include: the roller; a guide block configured to guide the rotation and movement of the roller; a cylinder part and a driving part configured to move the roller module in the length direction of the film attaching apparatus; and an overpressure prevention block disposed under the guide block.

According to various embodiments, the film attached to the flexible display may be made of a flexible, elastic and stretchable material.

According to various embodiments, the flexible, elastic and stretchable material may be urethane, thermoplastic polyurethane (TPU), or polyethylene terephthalate (PET).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A film attaching apparatus for attaching a film to an electronic device including a display, the film attaching apparatus comprising:
    a main body including a base plate;
    a jig disposed on a base plate, the jig configured to seat the electronic device thereon;
    a film suction-fixing part inclined at a predetermined angle with respect to the jig; and
    a roller module disposed on the base plate and comprising a roller slidable above the jig,
    wherein the film suction-fixing part includes two or more divided suction areas which are sequentially arranged to correspond to a moving direction of the roller module and configured to have different suction forces, respectively.

2. The film attaching apparatus of claim 1, wherein the suction areas comprise a first suction area, a second suction area, and a third suction area.

3. The film attaching apparatus of claim 2, wherein the first suction area, the second suction area, and the third suction area are configured to have suction forces that become sequentially higher to correspond to the moving direction of the roller.

4. The film attaching apparatus of claim 3, wherein the first suction area, the second suction area, and the third suction area comprise a first air suction hole, a second air suction hole, and a third air suction hole, respectively.

5. The film attaching apparatus of claim 4, wherein the third air suction hole further comprises a suction pad.

6. The film attaching apparatus of claim 2, wherein the film suction-fixing part comprises a seating surface on which the first suction area, the second suction area, and the third suction area are provided, and the seating surface is configured to have a size of 60% to 70% of a total area of the film which is configured to be fixed on the seating surface when the film is suctioned by the film suction-fixing part.

7. The film attaching apparatus of claim 1, further comprising:
    at least one inclined support part disposed on the base plate and configured to support thereon the film suction-fixing part to be inclined at a predetermined angle with respect to the jig.

8. The film attaching apparatus of claim 1, further comprising:
    at least one position adjuster and at least one support block, which are disposed on the base plate to adjust a position of the jig.

9. The film attaching apparatus of claim 1, wherein the roller module comprises:
    a roller;
    a guide block configured to guide rotation and movement of the roller; and
    a cylinder part and a driving part configured to move the roller module in a length direction of the film attaching apparatus.

10. The film attaching apparatus of claim 9, wherein the roller module further comprises an overpressure prevention block disposed under the guide block.

11. The film attaching apparatus of claim 10, wherein the overpressure prevention block is configured to have a gap from one surface of the base plate to a predetermined height under the guide block.

12. The film attaching apparatus of claim 1, wherein the jig comprises an inclined surface provided in a portion adjacent to an initial position before pressing the roller of the roller module.

13. The film attaching apparatus of claim 1, wherein the jig includes a stopper configured to limit movement of the roller module at one side end thereof.

14. The film attaching apparatus of claim 1, wherein the electronic device is a foldable electronic device comprising a flexible display.

15. The film attaching apparatus of claim 14, wherein the film attached to the flexible display is made of a flexible, elastic and stretchable material.

16. A film attaching apparatus for attaching a film to a foldable electronic device including a flexible display, the film attaching apparatus comprising:
    a main body including a base plate;
    a jig disposed on the base plate, the jig configured to seat the foldable electronic device thereon;
    at least one inclined support part disposed on the base plate;
    a cover part connected to the inclined support part by a hinge structure, the cover part configured to cover the jig by an opening and closing operation;
    a film suction-fixing part disposed on one surface of the cover part, the film suction-fixing part configured to be capable of suctioning and removing the film in a state of being inclined at a predetermined angle with respect to the jig; and
    a roller module disposed on the base plate, the roller module comprising a roller slidable above the jig,
    wherein the film suction-fixing part comprises a first suction area, a second suction area, and a third suction area sequentially disposed to correspond to a moving direction of the roller module.

17. The film attaching apparatus of claim 16, wherein the first suction area, the second suction area, and the third suction area are configured to have suction forces that become sequentially higher to correspond to the moving direction of the roller.

18. The film attaching apparatus of claim 16,
    wherein the first suction area, the second suction area, and the third suction area comprise a first air suction hole, a second air suction hole, and a third air suction hole, respectively, and
    wherein the third air suction hole further comprises a suction pad.

19. The film attaching apparatus of claim 16, wherein the roller module comprises:
    the roller;
    a guide block configured to guide rotation and movement of the roller;
    a cylinder part and a driving part configured to move the roller module in a length direction of the film attaching apparatus; and
    an overpressure prevention block disposed under the guide block.

20. The film attaching apparatus of claim 16, wherein the film attached to the flexible display is made of a flexible, elastic and stretchable material.

* * * * *